US011829516B1

(12) United States Patent
Raj

(10) Patent No.: US 11,829,516 B1
(45) Date of Patent: Nov. 28, 2023

(54) AUTOMATED ACTIONS FOR APPLICATION POLICY VIOLATIONS

(71) Applicant: Amazon Technologies, Inc., Seattle, WA (US)

(72) Inventor: Madhura Ashwin Raj, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 551 days.

(21) Appl. No.: 17/038,851

(22) Filed: Sep. 30, 2020

(51) Int. Cl.
*G06F 21/62* (2013.01)
*G06F 21/51* (2013.01)
*G06F 21/60* (2013.01)
*G06F 21/00* (2013.01)

(52) U.S. Cl.
CPC ............ *G06F 21/629* (2013.01); *G06F 21/51* (2013.01); *G06F 21/604* (2013.01)

(58) Field of Classification Search
CPC ...... G06F 21/629; G06F 21/51; G06F 21/604; G06F 21/62; G06F 21/6218; G06F 21/6281; G06F 21/121; G06F 21/12
See application file for complete search history.

(56) References Cited

U.S. PATENT DOCUMENTS

| | | | |
|---|---|---|---|
| 2010/0162347 A1* | 6/2010 | Barile ................. | G06F 21/552 726/1 |
| 2012/0150773 A1* | 6/2012 | DiCorpo ............... | G06N 20/00 706/12 |

* cited by examiner

*Primary Examiner* — Edward Zee
(74) *Attorney, Agent, or Firm* — Lee & Hayes, P.C.

(57) ABSTRACT

Systems and methods for automated actions for application policy violations are disclosed. For example, policy violation evaluation components may monitor requests and/or responses from one or more applications to identify content policy violations. When a violation is identified, an automated decision engine utilizes data representing the policy violation along with, in example, contextual information about the policy violation to identify a rule from a rules database that is associated with the policy violation. An action is determined from the selected rule, and a command is generated to perform the action in response to the policy violation.

20 Claims, 10 Drawing Sheets

700

Associate policy violation and contextual information with first action to be performed when policy violation occurs in association with response from application
702

Store first data representing rule for taking action, rule indicting that action is to be taken when policy violation is determined to occur and contextual information is associated with policy violation
704

Receive second data indicating occurrence of policy violation by application of application(s)
706

Select, based at least in part on second data indicating occurrence of policy violation in association with contextual information, rule
708

Determine first action to be performed based at least in part on rule
710

Cause first action to be performed in association with application
712

AUTOMATED ACTIONS FOR APPLICATION POLICY VIOLATIONS

BACKGROUND

Use of electronic devices to perform actions and/or to retrieve information has become available. Electronic devices receive input representing requests to perform actions, and, for example, output audio and text in response to such requests. Described herein are improvements in technology and solutions to technical problems that can be used to, among other things, control output of audio and/or text responses on electronic devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 7 illustrates a flow diagram of another example process for automated actions for application policy violations.

DETAILED DESCRIPTION

Figure 1:
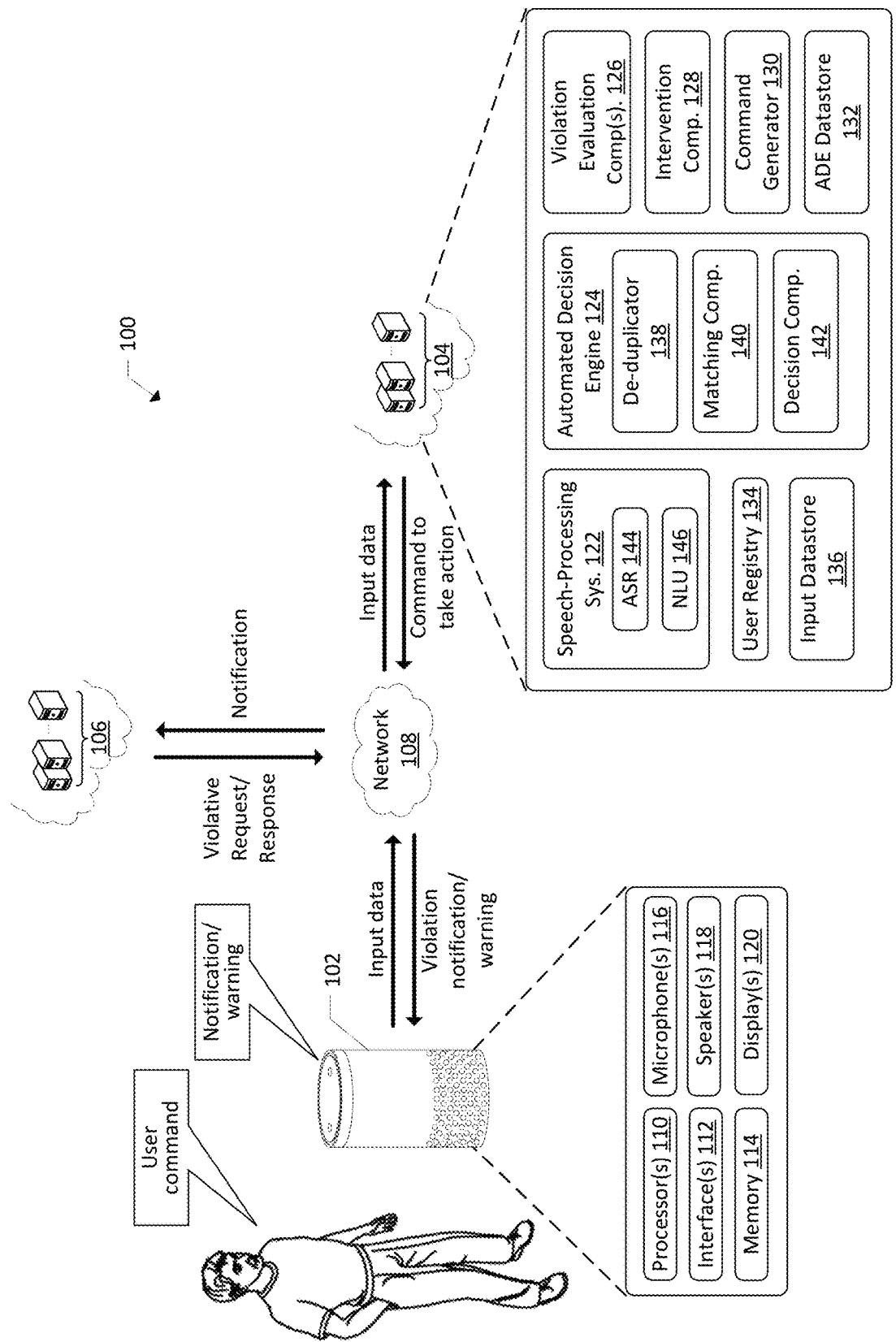
FIG. 1 illustrates a schematic diagram of an example environment for automated actions for application policy violations.

Systems and methods for automated actions for application policy violations are disclosed. Take, for example, an environment (such as a home, vehicle, office, store, restaurant, or other space) where one or more users may be present. The environments may include one or more electronic devices that may be utilized by the users. For example, the electronic devices may include voice interface devices (e.g., Echo devices, mobile phones, tablets, personal computers, etc.), graphical interface devices (e.g., televisions, set top boxes, virtual/augmented reality headsets, etc.), and/or touch interface devices (tablets, phones, steering wheels, laptops, kiosks, billboard, other devices with buttons, etc.). These electronic devices may be situated in a home, in a place a business, healthcare facility (e.g., hospital, doctor's office, pharmacy, etc.), in vehicle (e.g., airplane, truck, car, bus, etc.) in a public forum (e.g., shopping center, store, etc.), for example.

In examples, a user may utilize the electronic device to request content, request performance of operations by the electronic device, etc. In these and other examples, the electronic device may receive user input representing such user requests, which may be in the form of audio when the electronic device is a voice interface device and/or through user selection on a graphical user interface when the electronic device is a graphical interface device. User input data corresponding to the user input may be generated and sent to a remote system for processing. The remote system may determine intent data associated with the user input data and determine one or more applications that are configured to perform operations associated with the intent data. For example, the user input may be voice input such as "tell me my bank account balance." Audio data representing the voice input may be sent to the remote system, and a speech processing system may determine corresponding intent data to provide bank account balance information to the user. The speech processing system may determine one or more applications that are configured to respond to such a request for banking information, such as a banking application associated with user account data of the user. The remote system may query the banking application for the requested information or otherwise notify the banking application that a response to the voice input is requested. The banking application may provide responsive data to the remote system and/or the electronic device. In certain examples, the response may be the requested information. In other examples, the response may be a request for additional or otherwise clarifying information from the user, such as "which account would you like to know the balance of?" As such, the application may provide a response to the user request, and/or may request additional information from the user. In examples, such application responses and/or application requests may violate one or more content policies associated with the remote system and/or the application-related system. Examples of content policy violations include, for example, the inclusion of certain prohibited words and/or phrases, requests for information that have been predetermined to be sensitive, responses that include sensitive information, requests for explicit and/or inappropriate content, and/or requests and/or responses that include information predesignated as violating one or more content policies.

To determine policy violations, one or more violation evaluation components may be configured to receive data from the applications and determine if the received data violates the one or more content policies. In examples, each of the violation evaluation components may be configured to detect certain policy violations and/or to detect policy violations from certain applications and/or application types. For example, a given violation evaluation component may be configured to detect policy violations for applications indicated to be for children given that application requests/responses may violate policies associated with child-related content while other violation evaluation components configured to detect violations in adult-related content may not detect the same policy violations. By way of further example, some violation evaluation components may be configured to detect policy violations in requests/responses from applications noted as dealing with sensitive information, such as banking information, healthcare information, etc. Some or all of these violation evaluation components may receive data representing the requests/responses from the applications during a user interaction with the electronic device and/or retroactively after the user interaction occurs. The violation evaluation components may receive the application requests/responses as input and provide as output data indicating whether a policy violation has been detected, the type of policy violation, and/or a confidence value associated with the detection of the policy violation. In examples, the violation evaluation components may receive data from an intervention component, which may be configured to receive user input data indicating which requests/responses are associated with given policy violations. By so doing, the intervention component may train or otherwise configure the violation evaluation components to identify when policy violations occur. In examples where identification of policy violations are determined and corrective actions are taken in real time, such as prior to the violative response being output to the user, the remote system may refrain from sending the response to the electronic device based at least in part on requesting the response from the application-related system. In other words, when the remote system determines that a response is requested from the application-related system, the remote system may receive the response and instead of sending the response to the electronic device immediately, the remote system may evaluate the response for policy violations and take a corrective action prior to sending the response to the electronic device and/or instead of sending the response to the electronic device.

To assist in the performance of one or more actions to mitigate the policy violation and/or subsequent policy violations, the results data from the violation evaluation components may be provided to an automated decision engine, which may be configured to take an automated action on the policy violation. For example, a de-duplicator of the automated decision engine may determine if additional similar policy violations have been detected for the application in question. The similar policy violations may be the same violation, such as the inclusion of the same word in a request/response that is deemed to violate a content policy, and/or the similar policy violations may be of a similar type, such as the inclusion of different words in requests/responses where the different words still indicate violation of the same content policy. By so doing, the de-duplicator may be configured to determine distinct content policies that are being violated by the application in question and deduplicate occurrences of such violations such that a single action is taken and/or fewer actions are taken than the number of total policy violations determined for that application.

From there, a matching component of the automated decision engine may be configured to determine if one or more prior policy violations correspond to the current policy violation, and if so, if a given action was taken in response to detecting that prior policy violation. For example, a given policy violation evaluation component may have previously detected violation of a given content policy because of inclusion of a prohibited word in a prior request/response from an application. The automated decision engine may have previously determined that a given action was to be taken in response to that policy violation, such as the sending of a notification to the application-related system identifying the policy violation and requesting correction by the application-related system. In these examples, when the same policy violation is detected, such as by the same violation evaluation component, the same action may be taken without identifying rules from a rules engine as described elsewhere herein. By so doing, latency between when a policy violation is detected and when a corrective action is taken may be decreased, which may allow for such actions to be taken prior to when the violative content is output to the user.

In examples where the matching component does not determine that a prior policy violation corresponds to a current violation, and/or when contextual information associated with a current violation does not correspond to contextual information associated with prior policy violations, a decision component of the automated decision engine may be configured to utilize one or more predetermined rules for determining an action to take in response to the policy violation. The predetermined rules may be based at least in part on input received from, for example, individuals associated with the remote system and/or the application-related system. In these example, a rules user interface may be configured to display options for associating policy violations and/or contextual information associated with policy violations with actions to be taken to correct policy violations. The rules user interface may display policy violation types and/or policy violation factors that a user may consider when selecting what action to take when a given policy violation and given violation factors are present. For example, a nonexclusive list of policy violation factors may include the violation type, the violation evaluation component from which the indication of the policy violation was received, confidence value(s) associated with the policy violation determination, a policy-violation score associated with a developer identifier for the application, a policy-violation score associated with the application, timing information associated with the violation, prior actions taken with respect to the violation, and/or other contextual data associated with the violation. The user of the rules user interface may make selections to associate such violation factors and violation types with one or more actions. The actions may include, for example, sending a notification of the violation to the application-related system, sending a notification of the violation to the electronic device, redacting or otherwise augmenting the violative request/response to remove the violation prior to output on the electronic device, changing of an application category and/or maturity level, and/or suppression of the application from use, such as until a corrective measure is taken by the application-related system. It should be understood that additional or different actions are contemplated and that those actions described herein are provided by way of example. The rules described herein may also be generated utilizing, for example, models or other machine learning methods to identify potential actions to take when given violation factors and violation types occur. Data representing the rules may be stored in a rules engine, which may be configured to communicate with the decision component.

For example, for a given policy violation as indicated by one or more of the violation evaluation components, the decision component may provide input data to the rules engine, such as via a rules interface, indicating the violation type and/or the violation factors. The rules engine may be configured to receive the input data and determine one or more rules that correspond to the violation type and/or the violation factors. In instances where the rules engine identifies a rule that corresponds to the violation type and/or the violation factors, the rules engine may provide data representing the rule to the decision component, which may utilize the rule to determine which action to take. In instances where the rules engine does not identify a rule that corresponds to the violation type and/or the violation factors, the rules engine may identify the rule with the most similar violation type and/or violation factors, and provide data representing that rule to the decision engine.

The decision component, and/or the matching component in instances where the matching component identifies a prior action taken with respect to the same policy violation, may send data indicating the action to be taken to a command generator. The command generator may be configured to generate one or more commands to effectuate the identified action, as well as data associated with the action. For example, if the action is to send a notification to the application-related system, the command generator may generate notification data representing the notification as well as a command to cause the notification data to be sent to the application-related system. An automated decision engine datastore may also receive data indicating the automated action that was taken, and in examples the information associated with the policy violation. This data may be stored in the automated decision engine datastore and may be utilized to provide analytics to developers and/or to generate feedback data indicating accuracy and/or desirability of automated actions that were taken. This feedback data may be utilized to generate new rules for taking actions when policy violations occur.

The decision component may also be configured to determine when not to perform an action based at least in part on "cool down" and/or "back down" rules. For example, the rules may indicate that for a given policy violation and/or when given violation factors are present, a period of time is determined when the same action that has already been performed will not be performed again during the period of time. For example, if a notification is sent to the application-related system for a given policy violation, when another instance of the policy violation occurs within a predetermined period of time from when the notification was sent, the decision component may determine to refrain from sending another notification during that period of time. This may allow for correction time on the part of the application-related system. In other instances, the "back down" rules may indicate that once a given action is taken, a different, potentially less severe action is to be taken when another instance of the policy violation occurs. For example, if a first action that is taken in response to a policy violation is to change the maturity rating of the application, then the "back down" rule may be to send a notification of the policy violation and/or to simply note the policy violation for a subsequent violation, instead of determining whether the maturity rating should again be changed.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for automated actions for application policy violations. The system 100 may include, for example, an electronic device 102, which may include a communal device and/or a personal device. In certain examples, the device 102 may be a voice-enabled device (e.g., Echo devices, mobile phones, tablets, personal computers, etc.), a video interface device (e.g., televisions, set top boxes, virtual/augmented reality headsets, etc.), a touch interface device (tablets, phones, laptops, kiosks, billboard, etc.), and/or an accessory device (e.g., lights, plugs, locks, thermostats, appliances, televisions, clocks, smoke detectors, doorbells, cameras, motion/magnetic/other security-system sensors, etc.). In examples, the electronic device may be set-top box or other device that receives content data and facilitates the output of content, such as on other devices. The electronic device 102 may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, etc.), for example. The electronic devices 102 may be configured to send data to and/or receive data from a remote system 104 and/or an application-related system 106, such as via a network 108. It should be understood that where operations are described herein as being performed by the remote system 104, some or all of those operations may be performed by the electronic device 102. It should also be understood that anytime the remote system 104 is referenced, that system may include any system and/or device, whether local to an environment of the electronic device 102 or remote from that environment. Additionally, it should be understood that a given space and/or environment may include numerous electronic devices 102. It should also be understood that when a "space" or "environment" is used herein, those terms mean an area and not necessarily a given room, building, or other structure, unless otherwise specifically described as such.

The electronic devices 102 may include one or more components, such as, for example, one or more processors 110, one or more network interfaces 112, memory 114, one or more microphones 116, one or more speakers 118, and/or one or more displays 120. The microphones 116 may be configured to capture audio, such as user utterances, and generate corresponding audio data. The speakers 118 may be configured to output audio, such as audio corresponding to audio data received from another device and/or the system 104. The displays 120 may be configured to display images corresponding to image data, such as image data received from the remote system 104 and/or one or more other devices. It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 108 and to communicate with other devices in the system 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The remote system 104 may include components such as, for example, a speech-processing system 122, an automated decision engine 124, one or more violation evaluation components 126, an intervention component 128, a command generator 130, an automated decision engine datastore 132, a user registry 134, and/or an input datastore 136. It should be understood that while the speech-processing system 122 and the other components are depicted and/or described as separate from each other in FIG. 1, some or all of the components may be a part of the same system. The speech-processing system 122 may include an automatic speech recognition component (ASR) 144 and/or a natural language understanding component (NLU) 146. Each of the components described herein with respect to the remote system 104 may be associated with their own systems, which collectively may be referred to herein as the remote system 104, and/or some or all of the components may be associated with a single system. Additionally, the remote system 104 may include one or more applications, which may be described as skills. "Skills," as described herein may be applications and/or may be a subset of an application. For example, a skill may receive data representing an intent. For example, an intent may be determined by the NLU component 146 and/or as determined from user input via a computing device. Skills may be configured to utilize the intent to output data for input to a text-to-speech component, a link or other resource locator for audio data, and/or a command to a device, such as the electronic device 102. "Skills" may include applications running on devices, such as the electronic device 102, and/or may include portions that interface with voice user interfaces of electronic devices 102.

In instances where a voice-enabled device is utilized, skills may extend the functionality of devices 102 that can be controlled by users utilizing a voice-user interface. In some examples, skills may be a type of application that may be useable in association with accessory devices and may have been developed specifically to work in connection with given accessory devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

The components of the remote system 104 are described in detail below. In examples, some or each of the components of the remote system 104 may include their own processor(s), network interface(s), and/or memory. As such, by way of example, the speech-processing system 122 may include and/or be associated with processor(s), network interface(s), and/or memory. The other components of the remote system 104, such as the automated decision engine 124, may include and/or be associated with different processor(s), network interface(s), and/or memory, or one or more of these components may utilize some or all of the same processor(s), network interface(s), and/or memory utilized by the speech-processing system 122. These components are described in detail below. Additionally, the operations and/or functionalities associated with and/or described with respect to the components of the remote system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the component of the remote system 104, the user registry component 134 may be configured to determine and/or generate associations between users, user accounts, and/or devices. For example, one or more associations between user accounts may be identified, determined, and/or generated by the user registry 134. The user registry 134 may additionally store information indicating one or more applications and/or resources accessible to and/or enabled for a given user account. Additionally, the user registry 134 may include information indicating device identifiers, such as naming identifiers, associated with a given user account, as well as device types associated with the device identifiers. The user registry 134 may also include information indicating user account identifiers, naming indicators of devices associated with user accounts, and/or associations between devices, such as the devices 102. The user registry 134 may also include information associated with usage of the devices 102. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 122 may be configured to receive audio data from the devices 102 and/or other devices and perform speech-processing operations. For example, the ASR component 144 may be configured to generate text data corresponding to the audio data, and the NLU component 146 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "tell me my bank account balance," the NLU component 146 may identify a "banking" intent and the payload may be "identify account balance." In this example where the intent data indicates an intent to output audio identifying a bank account balance, the speech-processing system 122 may call one or more speechlets to effectuate the intent. Speechlets, as described herein may otherwise be described as applications and may include functionality for utilizing intent data to generate directives and/or instructions. For example, a banking speechlet may be called when the intent indicates that banking information is to be provided. The speechlet may be designated as being configured to handle the intent of identifying and providing banking information, for example. The speechlet may receive the intent data and/or other data associated with the user utterance from the NLU component 146, such as by an orchestrator of the remote system 104, and may perform operations to instruct the device 102 to output the content, for example. The remote system 104 may generate audio data confirming that requested content has been provided, such as by a text-to-speech component. The audio data may be sent from the remote system 104 to the electronic device 102 for output of corresponding audio by the speakers 118 of the device 102.

In examples, a user may utilize the electronic device 102 to request content, request performance of operations by the electronic device 102, etc. In these and other examples, the electronic device 102 may receive user input representing such user requests, which may be in the form of audio when the electronic device 102 is a voice interface device and/or through user selection on a graphical user interface when the electronic device 102 is a graphical interface device. User input data corresponding to the user input may be generated and sent to a remote system 104 for processing. The remote system 104 may determine intent data associated with the user input data and determine one or more applications that are configured to perform operations associated with the intent data. For example, the user input may be voice input such as "tell me my bank account balance." Audio data representing the voice input may be sent to the remote system 104, and the speech processing system 122 may determine corresponding intent data to provide bank account balance information to the user. The speech processing system 122 may determine one or more applications that are configured to respond to such a request for information, such as a banking application associated with user account data of the user. The remote system 104 may query the banking application for the requested information or otherwise notify the banking application that a response to the voice input is requested. The banking application may provide responsive data to the remote system 104 and/or the electronic device 102. In certain examples, the response may be the requested information. In other examples, the response may be a request for additional or otherwise clarifying information from the user, such as "which account would you like to know the balance of?" As such, the application may provide a response to the user request, and/or may request additional information from the user. In examples, such application responses and/or application requests may violate one or more content policies associated with the remote system 104 and/or the application-related system 106. Examples of content policy violations include, for example, the inclusion of certain words and/or phrases, requests for information that have been predetermined to be sensitive, responses that include sensitive information, requests for explicit and/or inappropriate content, and/or requests and/or responses that include information predesignated as violating one or more content policies.

To determine policy violations, one or more violation evaluation components 126 may be configured to receive data from the applications and determine if the received data violates the one or more content policies. In examples, each of the violation evaluation components 126 may be configured to detect certain policy violations and/or to detect policy violations from certain applications and/or application types. For example, a given violation evaluation component 126 may be configured to detect policy violations for applications indicated to be for children given that application requests/responses may violate policies associated with child-related content while other violation evaluation components 126 configured to detect violations in adult-related content may not detect the same policy violations. By way of further example, some violation evaluation components 126 may be configured to detect policy violations in requests/responses from applications noted as dealing with sensitive information, such as banking information, healthcare information, etc. Some or all of these violation evaluation components 126 may receive the requests/responses from the applications during a user interaction with the electronic device 102 and/or retroactively after the user interaction occurs. The violation evaluation components 126 may receive the application requests/responses as input and provide as output data indicating whether a policy violation has been detected, the type of policy violation, and/or a confidence value associated with the detection of the policy violation. In examples, the violation evaluation components 126 may receive data from an intervention component, which may be configured to receive user input data indicating which requests/responses are associated with given policy violations. By so doing, the intervention component 128 may train or otherwise configure the violation evaluation components 126 to identify when policy violations occur. For example, the intervention component 128 may provide an interface for users to identify content policies and/or to identify requests/responses that violate such content policies. This information may be utilized by the violation evaluation components 126 to detect policy violations without human intervention.

Regarding the identification of policy violations, a given violation evaluation component 126 may be configured to determine queries to be utilized for phrase evaluation of a response. Queries may be retrieved and may be utilized to determine whether impermissible phrases and/or permissible phrases are present in the input data. For example, the content may be percolated into a percolator query, which may be used to compare with queries stored in the data store. The percolator query may contain the content and/or portions of the content. In these examples, the query may include one or more fields, such as an query field used for indexing the query and including a JSON object that represents the query. The query field may be configured as a percolator field type that is configured to store the query in such a way that it can be used to match content defined on the percolator query. The percolator query may be utilized to index the queries associated with the client identifier and percolate the queries to identify which queries match or otherwise correspond to the percolator query. Some or all of the queries may be utilized to compare the impermissible and permissible phrases associated with those queries and the text data. For example, the queries may indicate one or more impermissible phrases and one or more permissible phrases. The text data may be searched for the impermissible phrases and permissible phrases, and if present, the query associated with the identified impermissible phrases and/or permissible phrases may be identified. The identified query may indicate an association between impermissible phrases and permissible phrases, and that association may be utilized to determine whether an impermissible phrase identified in the content also corresponds to a permissible phrase. In examples where the impermissible phrase corresponds to a permissible phrase, the impermissible phrase may not be counted as an impermissible phrase. In examples where the impermissible phrase does not correspond to a permissible phrase, the impermissible phrase may be counted as an impermissible phrase and the one or more actions described herein may be performed.

To assist in the performance of one or more actions to mitigate the policy violation and/or subsequent policy violations, the results data from the violation evaluation components 126 may be provided to the automated decision engine 124, which may be configured to take an automated action on the policy violation. For example, a de-duplicator 138 of the automated decision engine 124 may determine if additional similar policy violations have been detected for the application in question. The similar policy violations may be the same violation, such as the inclusion of the same word in a request/response that is deemed to violate a content policy, and/or the similar policy violations may be of a similar type, such as the inclusion of different words in requests/responses where the different words still indicate violation of the same content policy. By so doing, the de-duplicator 138 may be configured to determine distinct content policies that are being violated by the application in question and deduplicate occurrences of such violations such that a single action is taken and/or fewer actions are taken than the number of total policy violations determined for that application.

From there, a matching component 140 of the automated decision engine 124 may be configured to determine if one or more prior policy violations correspond to the current policy violation, and if so, if a given action was taken in response to detecting that policy violation. For example, a given violation evaluation component 126 may have previously detected violation of a given content policy because of inclusion of a prohibited word in a prior request/response from an application, and the automated decision engine 124 may have previously determined that a given action was to be taken in response to that policy violation, such as the sending of a notification to the application-related system 106 identifying the policy violation and requesting correction by the application-related system 106. In these examples, when the same policy violation is detected, such as by the same violation evaluation component 126, the same action may be taken without performing the rules-based operations described elsewhere herein. By so doing, latency between when a policy violation is detected and when a corrective action is taken may be decreased, which may allow for such actions to be taken prior to when the violative content is output to the user.

In examples where the matching component 140 does not determine that a prior policy violation corresponds to a current violation, and/or when contextual information associated with a current violation does not correspond to contextual information associated with prior policy violations, a decision component 142 of the automated decision engine 124 may be configured to utilize one or more predetermined rules for determining an action to take in response to the policy violation. The predetermined rules may be based at least in part on input received from, for example, individuals associated with the remote system 104 and/or the application-related system 106. In these example, a rules user interface may be configured to display options for associating policy violations and/or contextual information associated with policy violations with actions to be taken to correct policy violations. The rules user interface may display policy violation types and/or policy violation factors that a user may consider when selecting what action to take when a given policy violation and given violation factors are considered. For example, a nonexclusive list of policy violation factors may include the violation type, the violation evaluation component from which the indication of the policy violation was received, confidence value(s) associated with the policy violation determination, a policy-violation score associated with a developer identifier for the application, a policy-violation score associated with the application, timing information associated with the violation, prior actions taken with respect to the violation, and/or other contextual data associated with the violation. The user of the rules user interface may make selections to associate such violation factors and violation types with one or more actions. The actions may include, for example, sending a notification of the violation to the application-related system 106, sending a notification of the violation to the electronic device 102, redacting or otherwise augmenting the violative request/response to remove the violation prior to output on the electronic device 102, changing of an application category and/or maturity level, and/or suppression of the application from use, such as until a corrective measure is taken by the application-related system 106. It should be understood that additional or different actions are contemplated and that those actions described herein are provided by way of example. The rules described herein may also be generated utilizing, for example, models or other machine learning methods to identify potential actions to take when given violation factors and violation types occur. Data representing the rules may be stored in a rules engine, which may be configured to communicate with the decision component.

For example, for a given policy violation as indicated by one or more of the violation evaluation components, the decision component 142 may provide input data to the rules engine, such as via a rules interface, indicating the violation type and/or the violation factors. The input datastore 136 may be configured to provide the decision component 142 with data indicating one or more of the violation factors described herein, which may be stored in the input datastore 136 and queried when violation indications are received from the violation evaluation components 126. The rules engine may be configured to receive the input data and determine one or more rules that correspond to the violation type and/or the violation factors. In instances where the rules engine identifies a rule that corresponds to the violation type and/or the violation factors, the rules engine may provide data representing the rule to the decision component 142, which may utilize the rule to determine which action to take. In instances where the rules engine does not identify a rule that corresponds to the violation type and/or the violation factors, the rules engine may identify the rule with the most similar violation type and/or violation factors, and provide data representing that rule to the decision engine.

The decision component 142, and/or the matching component 140 in instances where the matching component 140 identifies a prior action taken with respect to the same policy violation, may send data indicating the action to be taken to the command generator 130. The command generator 130 may be configured to generate one or more commands to effectuate the identified action, as well as data associated with the action. For example, if the action is to send a notification to the application-related system 106, the command generator 130 may generate notification data representing the notification as well as a command to cause the notification data to be sent to the application-related system 106. The automated decision engine datastore 132 may also receive data indicating the automated action that was taken, and in examples the information associated with the policy violation. This data may be stored in the automated decision engine datastore 132 and may be utilized to provide analytics to developers and/or to generate feedback data indicating accuracy and/or desirability of automated actions that were taken. This feedback data may be utilized to generate new rules for taking actions when policy violations occur.

The decision component 142 may also be configured to determine when not to perform an action based at least in part on "cool down" and/or "back down" rules. For example, the rules may indicate that for a given policy violation and/or when given violation factors are present, a period of time is determined when the same action that has already been performed will not be performed again during the period of time. For example, if a notification is sent to the application-related system 106 for a given policy violation, when another instance of the policy violation occurs within a predetermined period of time from when the notification was sent, the decision component 142 may determine to refrain from sending another notification during that period of time. This may allow for correction time on the part of the application-related system 106. In other instances, the "back down" rules may indicate that once a given action is taken, a different, potentially less severe action is to be taken when another instance of the policy violation occurs. For example, if a first action that is taken in response to a policy violation is to change the maturity rating of the application, then the "back down" rule may be to send a notification of the policy violation and/or to simply note the policy violation for a subsequent violation, instead of determining whether the maturity rating should again be changed.

It should be noted that while text data is described as a type of data utilized to communicate between various components of the remote system 104 and/or other systems and/or devices, the components of the remote system 104 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102.

As shown in FIG. 1, several of the components of the remote system 104 and the associated functionality of those components as described herein may be performed by one or more of the electronic devices 102. Additionally, or alternatively, some or all of the components and/or functionalities associated with the electronic devices 102 may be performed by the remote system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 110 and/or the processor(s) described with respect to the components of the remote system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110 and/or the processor(s) described with respect to the components of the remote system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110 and/or the processor(s) described with respect to the components of the remote system 104 may possess its own local memory, which also may store program components, program data, and/or one or more operating systems.

The memory 114 and/or the memory described with respect to the components of the remote system 104 may include volatile and nonvolatile memory, removable and non-removable media implemented in any method or technology for storage of information, such as computer-readable instructions, data structures, program component, or other data. Such memory 114 and/or the memory described with respect to the components of the remote system 104 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114 and/or the memory described with respect to the components of the remote system 104 may be implemented as computer-readable storage media ("CRSM"), which may be any available physical media accessible by the processor(s) 110 and/or the processor(s) described with respect to the remote system 104 to execute instructions stored on the memory 114 and/or the memory described with respect to the components of the remote system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114 and/or the memory described with respect to the components of the remote system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 112 and/or the network interface(s) described with respect to the components of the remote system 104 may enable messages between the components and/or devices shown in system 100 and/or with one or more other polling systems, as well as other networked devices. Such network interface(s) 112 and/or the network interface(s) described with respect to the components of the remote system 104 may include one or more network interface controllers (NICs) or other types of transceiver devices to send and receive messages over the network 108.

For instance, each of the network interface(s) 112 and/or the network interface(s) described with respect to the components of the remote system 104 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112 and/or the network interface(s) described with respect to the components of the remote system 104 may include a wide area network (WAN) component to enable message over a wide area network.

In some instances, the remote system 104 may be local to an environment associated the electronic devices 102. For instance, the remote system 104 may be located within one or more of the electronic devices 102. In some instances, some or all of the functionality of the remote system 104 may be performed by one or more of the electronic devices 102. Also, while various components of the remote system 104 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device in a home and/or office environment, a self-driving automobile, a bus, an airplane, a camper, a trailer, and/or other similar object having a computer to perform its own sensor processing, etc.

Figure 2:
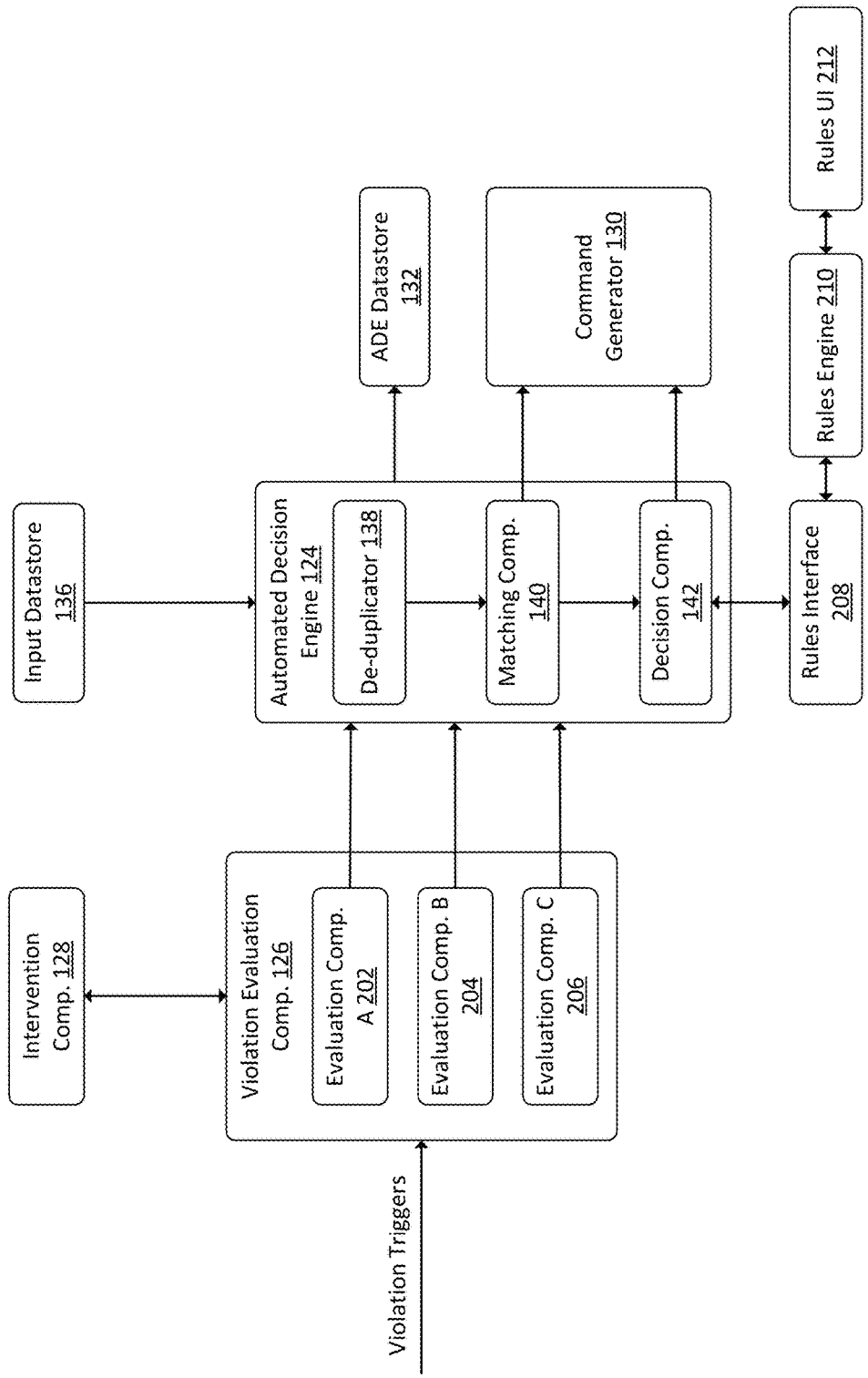
FIG. 2 illustrates a conceptual diagram of components utilized for automated actions for application policy violations.

FIG. 2 illustrates a conceptual diagram of components utilized for automated actions for application policy violations. The components may include at least some of the same or similar components as shown in FIG. 1. For example, the components may include violation evaluation components 126, an intervention component 128, an automated decision engine 124, an input datastore 136, a command generator 130, and/or an automated decision engine datastore 132. Additionally, the automated decision engine 124 may include the same or similar components as described in FIG. 1, such as a de-duplicator 138, a matching component 140, and/or a decision component 142. The components may also include specific violation evaluation components, such as Evaluation Component A 202, Evaluation Component B 204, and/or Evaluation Component C 206. Additional components may include a rules interface 208, a rules engine 210, and/or a rule user interface 212. The use of these components may be utilized for automated actions for application policy violations.

For example, to determine policy violations, the violation evaluation components 126 may be configured to receive data from the applications and determine if the received data violates the one or more content policies. In examples, each of the violation evaluation components 126 may be configured to detect certain policy violations and/or to detect policy violations from certain applications and/or application types. For example, Evaluation Component A 202 may be configured to detect policy violations for applications indicated to be for children given that application requests/responses may violate policies associated with child-related content while Evaluation Component B 204 may be configured to detect violations in adult-related content may not detect the same policy violations. By way of further example, some violation evaluation components 126, such as Evaluation Component C 206, may be configured to detect policy violations in requests/responses from applications noted as dealing with sensitive information, such as banking information, healthcare information, etc. Some or all of these violation evaluation components 126 may receive the requests/responses from the applications during a user interaction with an electronic device and/or retroactively after the user interaction occurs. The violation evaluation components 126 may receive the application requests/responses as input and provide as output data indicating whether a policy violation has been detected, the type of policy violation, and/or a confidence value associated with the detection of the policy violation. In examples, the violation evaluation components 126 may receive data from an intervention component, which may be configured to receive user input data indicating which requests/responses are associated with given policy violations. By so doing, the intervention component 128 may train or otherwise configure the violation evaluation components 126 to identify when policy violations occur. For example, the intervention component 128 may provide an interface for users to identify content policies and/or to identify requests/responses that violate such content policies. This information may be utilized by the violation evaluation components 126 to detect policy violations without human intervention.

To assist in the performance of one or more actions to mitigate the policy violation and/or subsequent policy violations, the results data from the violation evaluation components 126 may be provided to the automated decision engine 124, which may be configured to take an automated action on the policy violation. For example, the de-duplicator 138 of the automated decision engine 124 may determine if additional similar policy violations have been detected for the application in question. The similar policy violations may be the same violation, such as the inclusion of the same word in a request/response that is deemed to violate a content policy, and/or the similar policy violations may be of a similar type, such as the inclusion of different words in requests/responses where the different words still indicate violation of the same content policy. By so doing, the de-duplicator 138 may be configured to determine distinct content policies that are being violated by the application in question and deduplicate occurrences of such violations such that a single action is taken and/or fewer actions are taken than the number of total policy violations determined for that application.

From there, the matching component 140 of the automated decision engine 124 may be configured to determine if one or more prior policy violations correspond to the current policy violation, and if so, if a given action was taken in response to detecting that policy violation. For example, a given violation evaluation component 126 may have previously detected violation of a given content policy because of inclusion of a prohibited word in a prior request/response from an application, and the automated decision engine 124 may have previously determined that a given action was to be taken in response to that policy violation, such as the sending of a notification to an application-related system identifying the policy violation and requesting correction by the application-related system. In these examples, when the same policy violation is detected, such as by the same violation evaluation component 126, the same action may be taken without performing the rules-based operations described elsewhere herein. By so doing, latency between when a policy violation is detected and when a corrective action is taken may be decreased, which may allow for such actions to be taken prior to when the violative content is output to the user.

In examples where the matching component 140 does not determine that a prior policy violation corresponds to a current violation, and/or when contextual information associated with a current violation does not correspond to contextual information associated with prior policy violations, a decision component 142 of the automated decision engine 124 may be configured to utilize one or more predetermined rules for determining an action to take in response to the policy violation. The predetermined rules may be based at least in part on input received from, for example, individuals associated with the remote system and/or the application-related system. In these example, the rules user interface 212 may be configured to display options for associating policy violations and/or contextual information associated with policy violations with actions to be taken to correct policy violations. The rules user interface 212 may display policy violation types and/or policy violation factors that a user may consider when selecting what action to take when a given policy violation and given violation factors are considered. For example, a nonexclusive list of policy violation factors may include the violation type, the violation evaluation component from which the indication of the policy violation was received, confidence value(s) associated with the policy violation determination, a policy-violation score associated with a developer identifier for the application, a policy-violation score associated with the application, timing information associated with the violation, prior actions taken with respect to the violation, and/or other contextual data associated with the violation. The user of the rules user interface 212 may make selections to associate such violation factors and violation types with one or more actions. The actions may include, for example, sending a notification of the violation to the application-related system, sending a notification of the violation to the electronic device, redacting or otherwise augmenting the violative request/response to remove the violation prior to output on the electronic device, changing of an application category and/or maturity level, and/or suppression of the application from use, such as until a corrective measure is taken by the application-related system. It should be understood that additional or different actions are contemplated and that those actions described herein are provided by way of example. The rules described herein may also be generated utilizing, for example, models or other machine learning methods to identify potential actions to take when given violation factors and violation types occur. Data representing the rules may be stored in the rules engine 210, which may be configured to communicate with the decision component 142.

For example, for a given policy violation as indicated by one or more of the violation evaluation components, the decision component 142 may provide input data to the rules engine 210, such as via the rules interface 208, indicating the violation type and/or the violation factors. The input datastore 136 may be configured to provide the decision component 142 with data indicating one or more of the violation factors described herein, which may be stored in the input datastore 136 and queried when violation indications are received from the violation evaluation components 126. The rules engine 210 may be configured to receive the input data and determine one or more rules that correspond to the violation type and/or the violation factors. In instances where the rules engine 210 identifies a rule that corresponds to the violation type and/or the violation factors, the rules engine 210 may provide data representing the rule to the decision component 142, which may utilize the rule to determine which action to take. In instances where the rules engine 210 does not identify a rule that corresponds to the violation type and/or the violation factors, the rules engine 210 may identify the rule with the most similar violation type and/or violation factors, and provide data representing that rule to the decision engine 142.

The decision component 142, and/or the matching component 140 in instances where the matching component 140 identifies a prior action taken with respect to the same policy violation, may send data indicating the action to be taken to the command generator 130. The command generator 130 may be configured to generate one or more commands to effectuate the identified action, as well as data associated with the action. For example, if the action is to send a notification to the application-related system, the command generator 130 may generate notification data representing the notification as well as a command to cause the notification data to be sent to the application-related system. The automated decision engine datastore 132 may also receive data indicating the automated action that was taken, and in examples the information associated with the policy violation. This data may be stored in the automated decision engine datastore 132 and may be utilized to provide analytics to developers and/or to generate feedback data indicating accuracy and/or desirability of automated actions that were taken. This feedback data may be utilized to generate new rules for taking actions when policy violations occur.

Figure 3:
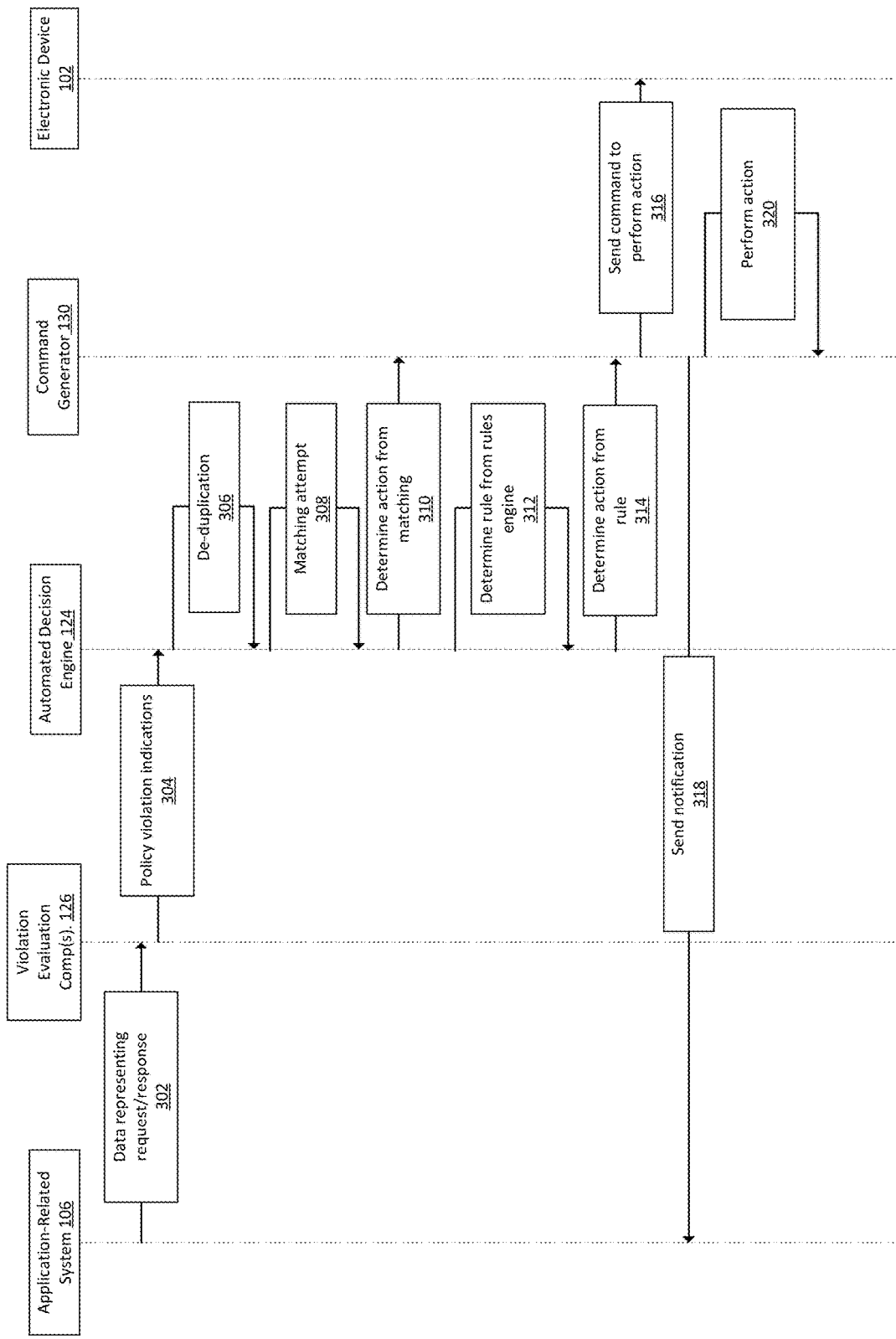
FIG. 3 illustrates a sequence diagram showing an example process associated with automated actions for application policy violations.

FIG. 3 illustrates a sequence diagram showing an example process associated with automated actions for application policy violations. While the sequence diagram depicts the performance of operations and/or the transmission of certain data in a sequential manner, the operations may be performed in a different order than the order depicted in FIG. 3 and/or at least a portion of the operations may be performed in parallel.

At block 302, an application-related system 106 may send data representing a request and/or a response to a user request to one or more violation evaluation components 126 of a remote system. In examples, a user may utilize the electronic device 102 to request content, request performance of operations by the electronic device 102, etc. In these and other examples, the electronic device 102 may receive user input representing such user requests, which may be in the form of audio when the electronic device 102 is a voice interface device and/or through user selection on a graphical user interface when the electronic device 102 is a graphical interface device. User input data corresponding to the user input may be generated and sent to a remote system for processing. The remote system may determine intent data associated with the user input data and determine one or more applications that are configured to perform operations associated with the intent data. For example, the user input may be voice input such as "tell me my bank account balance." Audio data representing the voice input may be sent to the remote system, and a speech processing system may determine corresponding intent data to provide bank account balance information to the user. The speech processing system may determine one or more applications that are configured to respond to such a request for information, such as a banking application associated with user account data of the user. The remote system may query the banking application for the requested information or otherwise notify the banking application that a response to the voice input is requested. The banking application may provide responsive data to the remote system and/or the electronic device. In certain examples, the response may be the requested information. In other examples, the response may be a request for additional or otherwise clarifying information from the user, such as "which account would you like to know the balance of?" As such, the application may provide a response to the user request, and/or may request additional information from the user. In examples, such application responses and/or application requests may violate one or more content policies associated with the remote system and/or the application-related system. Examples of content policy violations include, for example, the inclusion of certain words and/or phrases, requests for information that have been predetermined to be sensitive, responses that include sensitive information, requests for explicit and/or inappropriate content, and/or requests and/or responses that include information predesignated as violating one or more content policies.

At block 304, the violation evaluation component(s) 126 may determine that the request/response violates one or more content policies and may send an indication of the policy violation to an automated decision engine 124. To determine policy violations, one or more policy violation evaluation components may be configured to receive data from the applications and determine if the received data violates the one or more content policies. In examples, each of the policy violation evaluation components may be configured to detect certain policy violations and/or to detect policy violations from certain applications and/or application types. For example, a given policy violation evaluation component may be configured to detect policy violations for applications indicated to be for children given that application requests/responses may violate policies associated with child-related content while other violation evaluation components configured to detect violations in adult-related content may not detect the same policy violations. By way of further example, some violation evaluation components may be configured to detect policy violations in requests/responses from applications noted as dealing with sensitive information, such as banking information, healthcare information, etc. Some or all of these violation evaluation components may receive the requests/responses from the applications during a user interaction with the electronic device and/or retroactively after the user interaction occurs. The violation evaluation components may receive the application requests/responses as input and provide as output data indicating whether a policy violation has been detected, the type of policy violation, and/or a confidence value associated with the detection of the policy violation. In examples, the violation evaluation components may receive data from an intervention component, which may be configured to receive user input data indicating which requests/responses are associated with given policy violations. By so doing, the intervention component may train or otherwise configure the violation evaluation components to identify when policy violations occur.

At block 306, the automated decision engine 124 may perform de-duplication operations to de-duplicate policy violations such that distinct violations are acted on as opposed to each individual policy violation. For example, a de-duplicator of the automated decision engine 124 may determine if additional similar policy violations have been detected for the application in question. The similar policy violations may be the same violation, such as the inclusion of the same word in a request/response that is deemed to violate a content policy, and/or the similar policy violations may be of a similar type, such as the inclusion of different words in requests/responses where the different words still indicate violation of the same content policy. By so doing, the de-duplicator may be configured to determine distinct content policies that are being violated by the application in question and deduplicate occurrences of such violations such that a single action is taken and/or fewer actions are taken than the number of total policy violations determined for that application.

At block 308, the automated decision engine 124 may attempt to match the policy violation to a previous policy violation to determine whether a previous action on the same type of policy violation has been taken. For example, a matching component of the automated decision engine may be configured to determine if one or more prior policy violations correspond to the current policy violation, and if so, if a given action was taken in response to detecting that policy violation. For example, a given policy violation evaluation component may have previously detected violation of a given content policy because of inclusion of a prohibited word in a prior request/response from an application, and the automated decision engine may have previously determined that a given action was to be taken in response to that policy violation, such as the sending of a notification to the application-related system identifying the policy violation and requesting correction by the application-related system. In these examples, when the same policy violation is detected, such as by the same violation evaluation component, the same action may be taken without performing the rules-based operations described elsewhere herein. By so doing, latency between when a policy violation is detected and when a corrective action is taken may be decreased, which may allow for such actions to be taken prior to when the violative content is output to the user.

At block 310, the automated decision engine 124 may determine an action to perform utilizing the matching information determined from block 308. The action may correspond to the previous action taken in association with the prior similar policy violation.

At block 312, the automated decision engine 124 may determine a rule that is associated with the policy violation and/or violation factors associated with the policy violation from a rules engine. This process may be performed when the matching attempt is unsuccessful. In examples where the matching component does not determine that a prior policy violation corresponds to a current violation, and/or when contextual information associated with a current violation does not correspond to contextual information associated with prior policy violations, the decision component of the automated decision engine 124 may be configured to utilize one or more predetermined rules for determining an action to take in response to the policy violation. The predetermined rules may be based at least in part on input received from, for example, individuals associated with the remote system and/or the application-related system. In these example, a rules user interface may be configured to display options for associating policy violations and/or contextual information associated with policy violations with actions to be taken to correct policy violations. The rules user interface may display policy violation types and/or policy violation factors that a user may consider when selecting what action to take when a given policy violation and given violation factors are considered. For example, a nonexclusive list of policy violation factors may include the violation type, the violation evaluation component from which the indication of the policy violation was received, confidence value(s) associated with the policy violation determination, a policy-violation score associated with a developer identifier for the application, a policy-violation score associated with the application, timing information associated with the violation, prior actions taken with respect to the violation, and/or other contextual data associated with the violation. The user of the rules user interface may make selections to associate such violation factors and violation types with one or more actions. The actions may include, for example, sending a notification of the violation to the application-related system, sending a notification of the violation to the electronic device, redacting or otherwise augmenting the violative request/response to remove the violation prior to output on the electronic device, changing of an application category and/or maturity level, and/or suppression of the application from use, such as until a corrective measure is taken by the application-related system. It should be understood that additional or different actions are contemplated and that those actions described herein are provided by way of example. The rules described herein may also be generated utilizing, for example, models or other machine learning methods to identify potential actions to take when given violation factors and violation types occur. Data representing the rules may be stored in a rules engine, which may be configured to communicate with the decision component.

At block 314, the automated decision engine 124 may determine an action to perform based at least in part on the rule determined at block 312. An indication of the action may be sent to the command generator 130. For example, for a given policy violation as indicated by one or more of the violation evaluation components, the decision component may provide input data to the rules engine, such as via a rules interface, indicating the violation type and/or the violation factors. The rules engine may be configured to receive the input data and determine one or more rules that correspond to the violation type and/or the violation factors. In instances where the rules engine identifies a rule that corresponds to the violation type and/or the violation factors, the rules engine may provide data representing the rule to the decision component, which may utilize the rule to determine which action to take. In instances where the rules engine does not identify a rule that corresponds to the violation type and/or the violation factors, the rules engine may identify the rule with the most similar violation type and/or violation factors, and provide data representing that rule to the decision engine.

At block 316, the command generator 130 may generate a command and/or data associated with the selected action, and the command generator 130 may send the command, optionally, to the electronic device 102 from which the user input was received. For example, if the action is to send a notification to the electronic device 102, the command generator 130 may generate notification data representing the notification as well as a command to cause the notification data to be sent to the electronic device 102. An automated decision engine datastore may also receive data indicating the automated action that was taken, and in examples the information associated with the policy violation. This data may be stored in the automated decision engine datastore and may be utilized to provide analytics to developers and/or to generate feedback data indicating accuracy and/or desirability of automated actions that were taken. This feedback data may be utilized to generate new rules for taking actions when policy violations occur.

Additionally, or alternatively, at block 318, the command generator 130 may send the command to the application-related system 106. For example, if the action is to send a notification to the application-related system 106, the command generator 130 may generate notification data representing the notification as well as a command to cause the notification data to be sent to the application-related system 106.

Additionally, or alternatively, at block 320, the command generator 130 may send the command to one or more other components of the remote system for performance of the action. For example, the command may be to alter the maturity rating, application classification, or other attributes of the application in question. Additionally, particularly for severe and/or repeat policy violations for the same application, the command may be to suppress the application from use by users.

Figure 4:
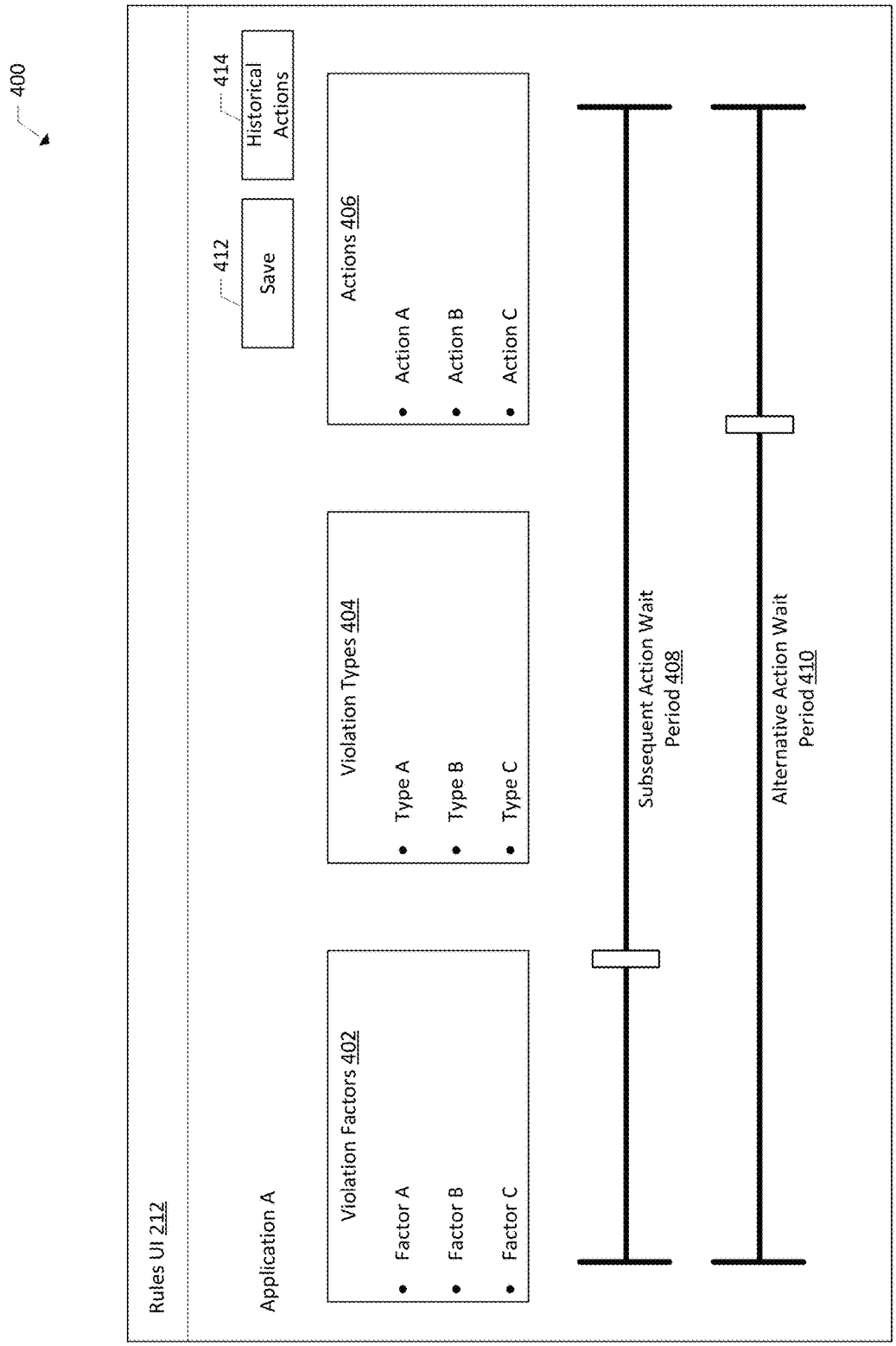
FIG. 4 illustrates an example user interface for developing and/or applying rules for taking automated actions for application policy violations.

FIG. 4 illustrates an example user interface 400 for developing and/or applying rules for taking automated actions for application policy violations. The user interface 400 may be the same or similar to the rules user interface 212 discussed elsewhere herein. The user interface 400 may be configured to display options for associating policy violation types 404 and/or violation factors 402 with actions 406.

The user interface 400 may display the policy violation types 404 and/or policy violation factors 402 that a user may consider when selecting what action 406 to take when a given policy violation type 404 and/or given violation factors 402 are considered. For example, a nonexclusive list of policy violation factors 402 may include the violation evaluation component from which the indication of the policy violation was received, confidence value(s) associated with the policy violation determination, a policy-violation score associated with a developer identifier for the application, a policy-violation score associated with the application, timing information associated with the violation, prior actions taken with respect to the violation, and/or other contextual data associated with the violation. The user of the user interface 400 may make selections to associate such violation factors 402 with one or more actions 406. The violation types 404 may include violations categorized by severity of violation and/or the type or particular content policy that was violated. The user of the user interface 400 may make selections to associate such violation types 404 with the one or more actions 406. The actions 406 may include, for example, sending a notification of the violation to the application-related system, sending a notification of the violation to the electronic device, redacting or otherwise augmenting the violative request/response to remove the violation prior to output on the electronic device, changing of an application category and/or maturity level, and/or suppression of the application from use, such as until a corrective measure is taken by the application-related system.

It should be understood that additional or different actions 406 are contemplated and that those actions described herein are provided by way of example. The rules described herein may also be generated utilizing, for example, models or other machine learning methods to identify potential actions to take when given violation factors and violation types occur. Data representing the rules may be stored in a rules engine, which may be configured to communicate with the decision component. It should also be understood that while the violation factors 402 are illustrated here as Factor A, Factor B, and Factor C, there may be one, two, three, or more than three violation factors 402. It should also be understood that while the violation types 404 are illustrated here as Type A, Type B, and Type C, there may be one, two, three, or more than three violation types 404. It should also be understood that while the actions 406 are illustrated here as Action A, Action B, and Action C, there may be one, two, three, or more than three actions 406.

Additionally, user interface 400 may be configured to receive user input on "cool down" and/or "back down" rules. For example, the user interface 400 may include a subsequent action wait period element 408, which may be represented as a slidable bar or other mechanism that may allow the user to adjust a period of time for not performing an action. For example, a given policy violation and/or when given violation factors are present, a the period of time is selected when the same action that has already been performed will not be performed again during the period of time. For example, if a notification is sent to the application-related system for a given policy violation, when another instance of the policy violation occurs within a predetermined period of time from when the notification was sent, the decision component may determine to refrain from sending another notification during that period of time. This may allow for correction time on the part of the application-related system. Additionally, the alternative action wait period element 410 may indicate that once a given action is taken, a different, potentially less severe action is to be taken when another instance of the policy violation occurs during the selected period of time. For example, if a first action that is taken in response to a policy violation is to change the maturity rating of the application, then the alternative action wait period rule may be to send a notification of the policy violation and/or to simply note the policy violation for a subsequent violation, instead of determining whether the maturity rating should again be changed.

The user interface 400 may also include a save option 412, which may be selected to save the rule for associating violation factors 402 and/or violation types 404 with actions 406. The user interface 400 may also include a historical actions option 414, which may be selected to view historical actions taken when a given violation type 404 occurs and/or when a given violation factor 402 is present.

Figure 5:
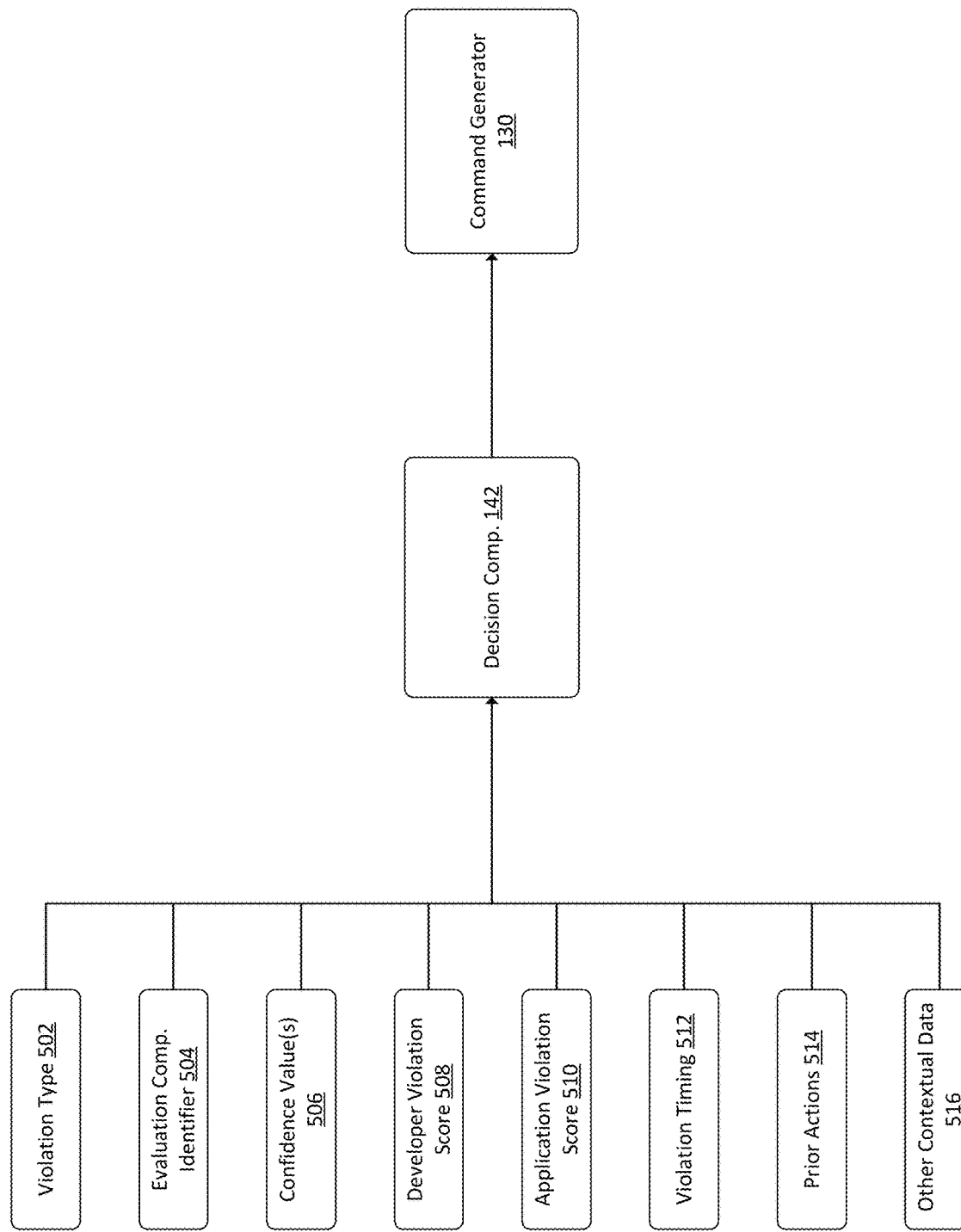
FIG. 5 illustrates a conceptual diagram of data and components utilized for determining a rule to apply for a given policy violation.

FIG. 5 illustrates a conceptual diagram of data and components utilized for determining a rule to apply for a given policy violation. The components may include at least some of the same or similar components as shown in FIG. 1. For example, the components may include a decision component 142 and/or a command generator 130. FIG. 5 also illustrates various example violation factors, which may be the same or similar to the violation factors 402 described with respect to FIG. 4. FIG. 5 illustrates the use of the violation factors by the decision component 142 to identify one or more rules to apply for determining an automated action to take in response to receiving an indication of a policy violation, as discussed more fully elsewhere herein.

For example, the violation factors may include a violation type 502, a violation evaluation component identifier 504, one or more confidence values 506, a developer violation score 508, an application violation score 510, violation timing 512, prior actions 514 that have been taken, and/or other contextual data 516. By way of example, the violation type 502 may indicate which content policy has been violated and/or a severity of the content policy violation. The violation evaluation component identifier 504 may indicate which violation evaluation component of multiple violation evaluation components detected the policy violation. The confidence values 506 may indicate a degree of confidence to which the violation evaluation component determined that the policy violation occurred. The developer violation score 508 may be a score that indicates historical policy violations associated with the developer of the application in question. The developer violation score 508 may be associated with historical violations of one or more other applications associated with the developer, and not necessarily just the application in question. The application violation score 510 may indicate historical content policy violations associated with the application in question. The violation timing 512 may indicate when the violation was detected in relation to other actions or points in time. For example, the violation timing 512 may indicate that the violation in question occurred after a warning notification had been previously sent, indicating that corrective action has not been taken. The prior actions 514 may indicate one or more actions that have been taken in response to previous policy violations associated with the application. The other contextual data 516 may include any other data associated with the application, developer, policy violation, and/or user account data to which an application request/response is being directed to.

The decision component 142 may be configured to utilize one or more predetermined rules for determining an action to take in response to the policy violation. The predetermined rules may be based at least in part on input received from, for example, individuals associated with the remote system and/or an application-related system. For a given policy violation as indicated by one or more of the violation evaluation components, the decision component 142 may provide input data to the rules engine, such as via a rules interface, indicating the violation type and/or the violation factors. An input datastore may be configured to provide the decision component 142 with data indicating one or more of the violation factors described herein, which may be stored in the input datastore and queried when violation indications are received from the violation evaluation components. The rules engine may be configured to receive the input data and determine one or more rules that correspond to the violation type and/or the violation factors. In instances where the rules engine identifies a rule that corresponds to the violation type and/or the violation factors, the rules engine may provide data representing the rule to the decision component 142, which may utilize the rule to determine which action to take. In instances where the rules engine does not identify a rule that corresponds to the violation type and/or the violation factors, the rules engine may identify the rule with the most similar violation type and/or violation factors, and provide data representing that rule to the decision engine.

For example, when a rule is generated as described herein, that rule may indicate the violation factors and/or details about such violation factors that are to be present for the rule to apply to a given policy violation. By way of example, a give rule may be associated with a specific violation type where the indication of the violation is received from a given violation evaluation component and the developer evaluation score and the application related score each satisfy threshold scores. If the contextual information associated with a given violation corresponds to these violation factors, then the rule may be selected and utilized to determine which action is to be performed. Selection of violation factors to apply to given rules may be performed utilizing the rules user interface and/or utilizing machine-learning techniques as described herein.

The decision component 142 may send data indicating the action to be taken to the command generator 130. The command generator 130 may be configured to generate one or more commands to effectuate the identified action, as well as data associated with the action. For example, if the action is to send a notification to the application-related system, the command generator 130 may generate notification data representing the notification as well as a command to cause the notification data to be sent to the application-related system.

Figure 6:
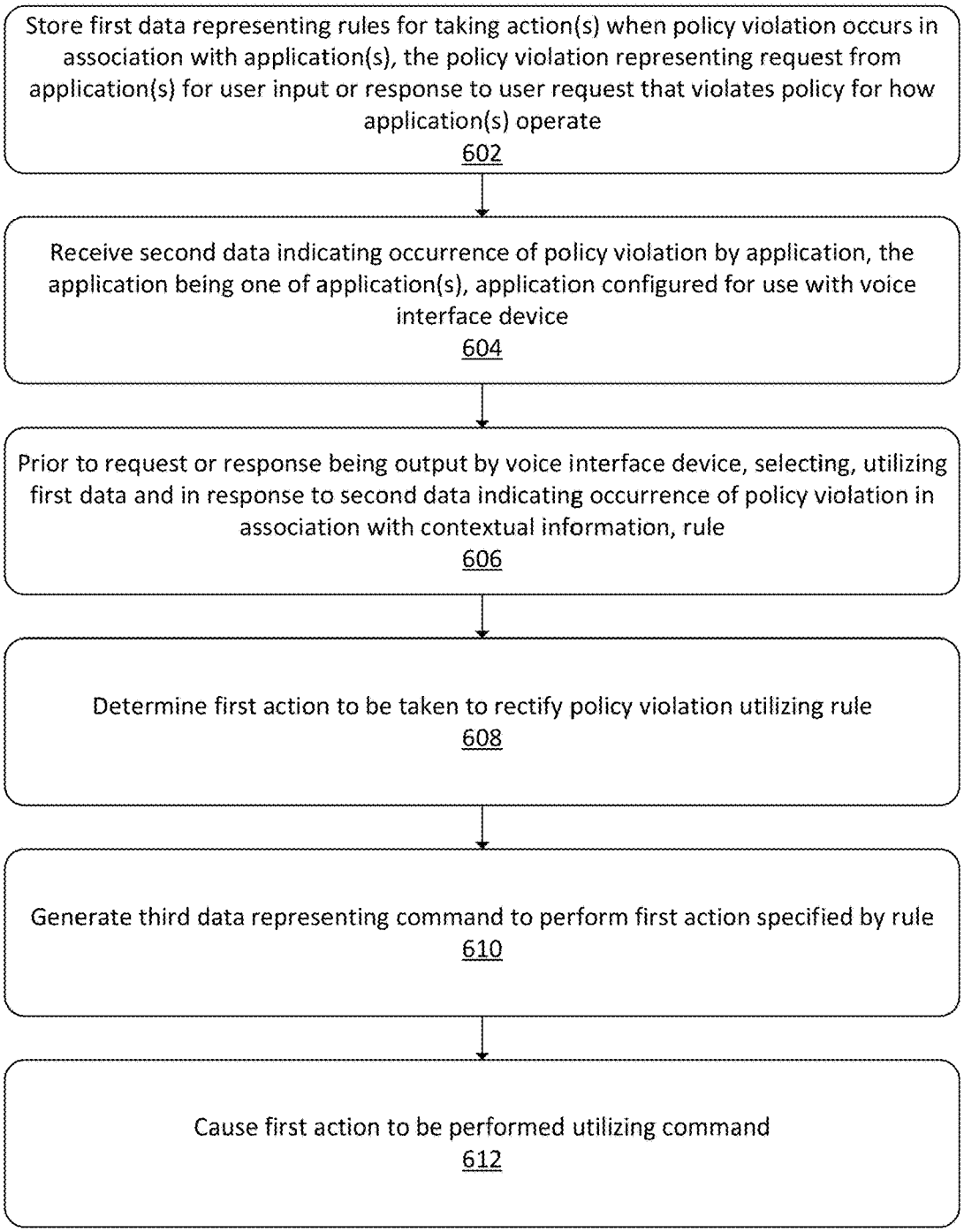
FIG. 6 illustrates a flow diagram of an example process for automated actions for application policy violations.

FIGS. 6 and 7 illustrate processes for automated actions for application policy violations. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5, 8, and 9, although the processes may be implemented in a wide variety of other environments, architectures and systems.

FIG. 6 illustrates a flow diagram of an example process 600 for automated actions for application policy violations. The order in which the operations or steps are described is not intended to be construed as a limitation, and any number of the described operations may be combined in any order and/or in parallel to implement process 600.

At block 602, the process 600 may include storing first data representing rules for taking one or more actions when a policy violation occurs in association with one or more applications, the policy violation representing a request from the one or more applications for user input or a response to a user request that violates a policy for how the one or more applications operate. For example, predetermined rules may be based at least in part on input received from, for example, individuals associated with the remote system and/or the application-related system. In these example, a rules user interface may be configured to display options for associating policy violations and/or contextual information associated with policy violations with actions to be taken to correct policy violations. The rules user interface may display policy violation types and/or policy violation factors that a user may consider when selecting what action to take when a given policy violation and given violation factors are considered. For example, a nonexclusive list of policy violation factors may include the violation type, the violation evaluation component from which the indication of the policy violation was received, confidence value(s) associated with the policy violation determination, a policy-violation score associated with a developer identifier for the application, a policy-violation score associated with the application, timing information associated with the violation, prior actions taken with respect to the violation, and/or other contextual data associated with the violation. The user of the rules user interface may make selections to associate such violation factors and violation types with one or more actions. The actions may include, for example, sending a notification of the violation to the application-related system, sending a notification of the violation to the electronic device, redacting or otherwise augmenting the violative request/response to remove the violation prior to output on the electronic device, changing of an application category and/or maturity level, and/or suppression of the application from use, such as until a corrective measure is taken by the application-related system. It should be understood that additional or different actions are contemplated and that those actions described herein are provided by way of example. The rules described herein may also be generated utilizing, for example, models or other machine learning methods to identify potential actions to take when given violation factors and violation types occur. Data representing the rules may be stored in a rules engine, which may be configured to communicate with a decision component as described below.

At block 604, the process 600 may include receiving second data indicating occurrence of the policy violation by an application, the application being one of the one or more applications, the application configured for use with a voice interface device. To determine policy violations, one or more policy violation evaluation components may be configured to receive data from applications and determine if the received data violates the one or more content policies. In examples, each of the policy violation evaluation components may be configured to detect certain policy violations and/or to detect policy violations from certain applications and/or application types. For example, a given policy violation evaluation component may be configured to detect policy violations for applications indicated to be for children given that application requests/responses may violate policies associated with child-related content while other violation evaluation components configured to detect violations in adult-related content may not detect the same policy violations. By way of further example, some violation evaluation components may be configured to detect policy violations in requests/responses from applications noted as dealing with sensitive information, such as banking information, healthcare information, etc. Some or all of these violation evaluation components may receive the requests/responses from the applications during a user interaction with the electronic device and/or retroactively after the user interaction occurs. The violation evaluation components may receive the application requests/responses as input and provide as output data indicating whether a policy violation has been detected, the type of policy violation, and/or a confidence value associated with the detection of the policy violation. In examples, the violation evaluation components may receive data from an intervention component, which may be configured to receive user input data indicating which requests/responses are associated with given policy violations. By so doing, the intervention component may train or otherwise configure the violation evaluation components to identify when policy violations occur.

At block 606, the process 600 may include prior to the request or the response being output by the voice interface device, selecting, utilizing the first data and in response to the second data indicating occurrence of the policy violation in association with the contextual information, the rule. For example, for a given policy violation as indicated by one or more of the violation evaluation components, the decision component may provide input data to the rules engine, such as via the rules interface, indicating the violation type and/or the violation factors. An input datastore may be configured to provide the decision component with data indicating one or more of the violation factors described herein, which may be stored in the input datastore and queried when violation indications are received from the violation evaluation components. The rules engine may be configured to receive the input data and determine one or more rules that correspond to the violation type and/or the violation factors. In instances where the rules engine identifies a rule that corresponds to the violation type and/or the violation factors, the rules engine may provide data representing the rule to the decision component, which may utilize the rule to determine which action to take. In instances where the rules engine does not identify a rule that corresponds to the violation type and/or the violation factors, the rules engine may identify the rule with the most similar violation type and/or violation factors, and provide data representing that rule to the decision engine.

At block 608, the process 600 may include determining the first action to be taken to rectify the policy violation utilizing the rule. For example, the decision component may receive data indicating the rule and may identify the action that the rule associates with the policy violation type and/or the contextual information associated with the given policy violation.

At block 610, the process 600 may include generating third data representing a command to perform the first action specified by the rule. For example, a command generator may be configured to generate one or more commands to effectuate the identified action, as well as data associated with the action. For example, if the action is to send a notification to the application-related system, the command generator may generate notification data representing the notification as well as a command to cause the notification data to be sent to the application-related system.

At block 612, the process 600 may include causing the first action to be performed utilizing the command. For example, when the action to be performed is to be performed by the electronic device, the command may include instructions for the electronic device to utilize to perform the action. When the action is to be performed by the application-related system, the command may include instructions and/or request data for the application-related system to utilize to perform the action. When the action is to be performed by the remote system, the command may include instructions that are configured to cause one or more components of the remote system to perform the action.

Additionally, or alternatively, the process 600 may include determining fourth data representing a first policy-violation score for an entity identifier indicated to have developed the application, the first policy-violation score indicating historical policy violations associated with the entity identifier. The process 600 may also include determining fifth data representing a second policy-violation score associated with the application, the second policy-violation score indicating historical policy violations associated with the application. In these examples, determining the rule may be based at least in part on the fourth data and the fifth data.

Additionally, or alternatively, the process 600 may include storing fourth data indicating that a second action has been previously performed in association with a first instance of a second policy violation. The process 600 may also include receiving fifth data indicating a second instance of the second policy violation has occurred. The process 600 may also include causing, in response to the second action having been performed in association with the first instance of the second policy violation, the second action to be performed in association with the second instance of the second policy violation.

Additionally, or alternatively, the process 600 may include receiving, after causing the first action to be performed, fourth data indicating subsequent occurrence of the policy violation by the application within a threshold period of time from receiving the second data. The process 600 may also include determining to refrain from causing the first action to be performed again in response to the fourth data being received within the threshold period of time.

Additionally, or alternatively, the process 600 may include determining fourth data representing a first policy-violation score for an entity identifier indicated to have developed the application, the first policy-violation score indicating historical policy violations associated with the entity identifier. The process 600 may also include determining that the first policy-violation score satisfies a first threshold policy-violation score, the first threshold policy-violation score included as a first portion of the contextual information. The process 600 may also include determining fifth data representing a second policy-violation score associated with the application, the second policy-violation score indicating historical policy violations associated with the application. The process 600 may also include determining that the second policy-violation score satisfies a second threshold policy-violation score, the second threshold policy-violation score included a second portion of the contextual information. In these examples, selecting the rule may be in response to the first policy-violation score satisfying the first threshold policy-violation score and the second policy-violation score satisfying the second threshold policy-violation score.

Additionally, or alternatively, the process 600 may include causing a second action to be performed in association with a first instance of a second policy violation, the second action determined from the multiple rules of the first data. The process 600 may also include storing fourth data associating the second action with the second policy violation and receiving fifth data indicating a second instance of the second policy violation has occurred. The process 600 may also include determining to refrain from selecting one or more of the multiple rules in response to the fourth data associating the second action with the second policy violation and causing the second action to be performed in association with the second instance of the second policy violation.

Additionally, or alternatively, the process 600 may include receiving feedback data associated with causing the first action to be taken in association with the second data, the feedback data indicating the first action should not have been associated with the policy violation. The process 600 may also include determining one or more alternative actions to associate with subsequent instances of the policy violation. The process 600 may also include generating a user interface configured to display an indication of the one or more alternative actions. The process 600 may also include receiving user input data indicating a selected alternative action from the one or more alternative actions and generating fourth data associating the policy violation and the contextual information with the selected alternative action.

FIG. 7 illustrates a flow diagram of another example process 700 for automated actions for application policy violations. The order in which the operations or steps are described is not intended to be construed as a limitation, and any number of the described operations may be combined in any order and/or in parallel to implement process 700.

At block 702, the process 700 may include associating a policy violation and contextual information with a first action to be performed when the policy violation occurs in association with a response from an application. For example, predetermined rules may be based at least in part on input received from, for example, individuals associated with the remote system and/or the application-related system. In these example, a rules user interface may be configured to display options for associating policy violations and/or contextual information associated with policy violations with actions to be taken to correct policy violations. The rules user interface may display policy violation types and/or policy violation factors that a user may consider when selecting what action to take when a given policy violation and given violation factors are considered. For example, a nonexclusive list of policy violation factors may include the violation type, the violation evaluation component from which the indication of the policy violation was received, confidence value(s) associated with the policy violation determination, a policy-violation score associated with a developer identifier for the application, a policy-violation score associated with the application, timing information associated with the violation, prior actions taken with respect to the violation, and/or other contextual data associated with the violation. The user of the rules user interface may make selections to associate such violation factors and violation types with one or more actions. The actions may include, for example, sending a notification of the violation to the application-related system, sending a notification of the violation to the electronic device, redacting or otherwise augmenting the violative request/response to remove the violation prior to output on the electronic device, changing of an application category and/or maturity level, and/or suppression of the application from use, such as until a corrective measure is taken by the application-related system. It should be understood that additional or different actions are contemplated and that those actions described herein are provided by way of example. The rules described herein may also be generated utilizing, for example, models or other machine learning methods to identify potential actions to take when given violation factors and violation types occur.

At block 704, the process 700 may include storing first data representing a rule for taking the action, the rule indicting that the action is to be taken when the policy violation is determined to occur and the contextual information is associated with the policy violation. Data representing the rules may be stored in a rules engine, which may be configured to communicate with a decision component as described below.

At block 706, the process 700 may include receiving second data indicating occurrence of a policy violation by an application of one or more applications. To determine policy violations, one or more policy violation evaluation components may be configured to receive data from applications and determine if the received data violates the one or more content policies. In examples, each of the policy violation evaluation components may be configured to detect certain policy violations and/or to detect policy violations from certain applications and/or application types. For example, a given policy violation evaluation component may be configured to detect policy violations for applications indicated to be for children given that application requests/responses may violate policies associated with child-related content while other violation evaluation components configured to detect violations in adult-related content may not detect the same policy violations. By way of further example, some violation evaluation components may be configured to detect policy violations in requests/responses from applications noted as dealing with sensitive information, such as banking information, healthcare information, etc. Some or all of these violation evaluation components may receive the requests/responses from the applications during a user interaction with the electronic device and/or retroactively after the user interaction occurs. The violation evaluation components may receive the application requests/responses as input and provide as output data indicating whether a policy violation has been detected, the type of policy violation, and/or a confidence value associated with the detection of the policy violation. In examples, the violation evaluation components may receive data from an intervention component, which may be configured to receive user input data indicating which requests/responses are associated with given policy violations. By so doing, the intervention component may train or otherwise configure the violation evaluation components to identify when policy violations occur.

At block 708, the process 700 may include selecting, based at least in part on the second data indicating occurrence of the policy violation in association with the contextual information, the rule. For example, for a given policy violation as indicated by one or more of the violation evaluation components, the decision component may provide input data to the rules engine, such as via the rules interface, indicating the violation type and/or the violation factors. An input datastore may be configured to provide the decision component with data indicating one or more of the violation factors described herein, which may be stored in the input datastore and queried when violation indications are received from the violation evaluation components. The rules engine may be configured to receive the input data and determine one or more rules that correspond to the violation type and/or the violation factors.

At block 710, the process 700 may include determining a first action to be performed based at least in part on the rule. In instances where the rules engine identifies a rule that corresponds to the violation type and/or the violation factors, the rules engine may provide data representing the rule to the decision component, which may utilize the rule to determine which action to take. In instances where the rules engine does not identify a rule that corresponds to the violation type and/or the violation factors, the rules engine may identify the rule with the most similar violation type and/or violation factors, and provide data representing that rule to the decision engine.

At block 712, the process 700 may include causing the first action to be performed in association with the application. For example, when the action to be performed is to be performed by the electronic device, a command may include instructions for the electronic device to utilize to perform the action. When the action is to be performed by the application-related system, the command may include instructions and/or request data for the application-related system to utilize to perform the action. When the action is to be performed by the remote system, the command may include instructions that are configured to cause one or more components of the remote system to perform the action.

Additionally, or alternatively, the process 700 may include determining fourth data representing a first score for an entity identifier associated with the application, the first score indicating historical policy violations associated with the entity identifier. The process 700 may also include determining fifth data representing a second score associated with the application, the second score indicating historical policy violations associated with the application. In these examples, determining the third data may include determining the third data based at least in part on the fourth data and the fifth data.

Additionally, or alternatively, the process 700 may include storing fourth data indicating that a second action has been previously performed in association with a first instance of a second policy violation. The process 700 may also include receiving fifth data indicating a second instance of the second policy violation has occurred. The process 700 may also include causing, based at least in part on the second action having been performed in association with the first instance of the second policy violation, the second action to be performed.

Additionally, or alternatively, the process 700 may include receiving fourth data indicating subsequent occurrence of the policy violation by the application within a threshold period of time from receiving the second data. The process 700 may also include determining to refrain from causing the first action to be performed in response to the subsequent occurrence based at least in part on the fourth data being received within the threshold period of time.

Additionally, or alternatively, the process 700 may include determining that the policy violation is associated with a violation severity value. The process 700 may also include determining that the violation severity value satisfies a threshold violation severity value. The process 700 may also include determining to refrain from causing the first action to be performed for a predetermined period of time based at least in part on the violation severity value satisfying the threshold violation severity value.

Additionally, or alternatively, the process 700 may include generating a user interface configured to: display options for associating rules with: policy violations; and contextual information associated with the policy violations; and receive user input representing selection of the options. The process 700 may also include receiving, utilizing the user interface, user input data representing selection of the rule to be performed when the policy violation occurs and generating the first data based at least in part on the user input data.

Additionally, or alternatively, the process 700 may include determining that the second data was received from a policy violation evaluation component configured to violation evaluation component first policy violation types, the first policy violation evaluation component being one of multiple policy violation evaluation components. In these examples, determining the third data comprises determining the third data based at least in part on the second data being received from the policy violation evaluation component.

Additionally, or alternatively, the process 700 may include determining a number of times the policy violation has occurred in association with the application. The process 700 may also include determining that the number of times satisfies a threshold number of times. The process 700 may also include causing the application to be suppressed from use based at least in part on the number of times satisfying the threshold number of times.

Figure 8:
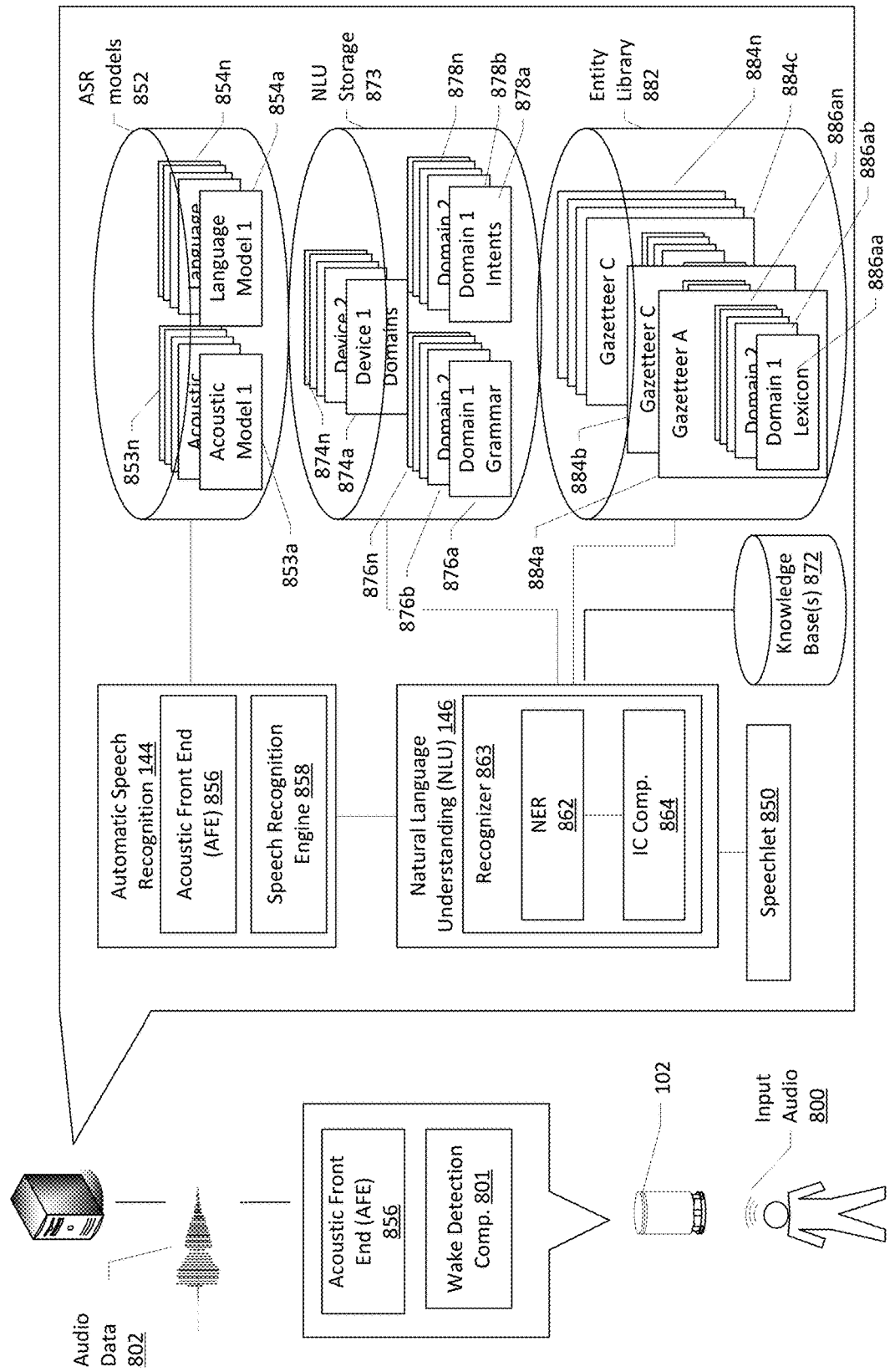
FIG. 8 illustrates a conceptual diagram of components of a speech-processing system for processing audio data provided by one or more devices.

FIG. 8 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 104). The various components illustrated may be located on a same device or different physical devices. Message between various components illustrated in FIG. 8 may occur directly or across a network 108. An audio capture component, such as a microphone 116 of the device 102, or another device, captures audio 800 corresponding to a spoken utterance. The device 102, using a wake word engine 801, then processes audio data corresponding to the audio 800 to determine if a keyword (such as a wakeword) is detected in the audio data. Following detection of a wakeword, the device 102 sends audio data 802 corresponding to the utterance to the remote system 104 that includes an ASR component 144. The audio data 802 may be output from an optional acoustic front end (AFE) 856 located on the device prior to transmission. In other instances, the audio data 802 may be in a different form for processing by a remote AFE 856, such as the AFE 856 located with the ASR component 144 of the remote system 104.

The wake word engine 801 works in conjunction with other components of the user device, for example a microphone to detect keywords in audio 800. For example, the device may convert audio 800 into audio data, and process the audio data with the wake word engine 801 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 801 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 801 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 802 corresponding to input audio 800 to the remote system 104 for speech processing. Audio data corresponding to that audio may be sent to remote system 104 for routing to a recipient device or may be sent to the remote system 104 for speech processing for interpretation of the included speech (either for purposes of enabling voice-messages and/or for purposes of executing a command in the speech). The audio data 802 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 104, an ASR component 144 may convert the audio data 802 into text. The ASR transcribes audio data into text data representing the words of the speech contained in the audio data 802. The text data may then be used by other components for various purposes, such as executing system commands, inputting data, etc. A spoken utterance in the audio data is input to a processor configured to perform ASR which then interprets the utterance based on the similarity between the utterance and pre-established language models 854 stored in an ASR model knowledge base (ASR Models Storage 852). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 853 stored in an ASR Models Storage 852), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 144 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 856 and a speech recognition engine 858. The acoustic front end (AFE) 856 transforms the audio data from the microphone into data for processing by the speech recognition engine 858. The speech recognition engine 858 compares the speech recognition data with acoustic models 853, language models 854, and other data models and information for recognizing the speech conveyed in the audio data. The AFE 856 may reduce noise in the audio data and divide the digitized audio data into frames representing time intervals for which the AFE 856 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 858 may process the output from the AFE 856 with reference to information stored in speech/model storage (852). Alternatively, post front-end processed data (such as feature vectors) may be received by the device executing ASR processing from another source besides the internal AFE. For example, the user device may process audio data into feature vectors (for example using an on-device AFE 856) and transmit that information to a server across a network for ASR processing. Feature vectors may arrive at the remote system 104 encoded, in which case they may be decoded prior to processing by the processor executing the speech recognition engine 858.

The speech recognition engine 858 attempts to match received feature vectors to language phonemes and words as known in the stored acoustic models 853 and language models 854. The speech recognition engine 858 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, what's my bank account balance?" The wake detection component may identify the wake word, otherwise described as a trigger expression, "Alexa," in the user utterance and may "wake" based on identifying the wake word. Audio data corresponding to the user utterance may be sent to the remote system 104, where the speech recognition engine 858 may identify, determine, and/or generate text data corresponding to the user utterance, here "what's my bank account balance."

The speech recognition engine 858 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 858 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 104, for natural language understanding (NLU) processing, such as conversion of the text into commands for execution, either by the user device, by the remote system 104, or by another device (such as a server running a specific application like a search engine, etc.).

The device performing NLU processing 146 (e.g., server 104) may include various components, including potentially dedicated processor(s), memory, storage, etc. As shown in FIG. 8, an NLU component 146 may include a recognizer 863 that includes a named entity recognition (NER) component 862 which is used to identify portions of query text that correspond to a named entity that may be recognizable by the system. A downstream process called named entity resolution links a text portion to a specific entity known to the system. To perform named entity resolution, the system may utilize gazetteer information (884a-884n) stored in entity library storage 882. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 144 based on the utterance input audio 800) and attempts to make a semantic interpretation of the text. That is, the NLU process determines the meaning behind the text based on the individual words and then implements that meaning. NLU processing 146 interprets a text string to derive an intent or a desired action from the user as well as the pertinent pieces of information in the text that allow a device (e.g., device 102) to complete that action. For example, if a spoken utterance is processed using ASR 144 and outputs the text "what's my bank account balance" the NLU process may determine that the user intended to have "bank account balance" output by one or more devices.

The NLU 146 may process several textual inputs related to the same utterance. For example, if the ASR 144 outputs N text segments (as part of an N-best list), the NLU may process all N outputs to obtain NLU results.

As will be discussed further below, the NLU process may be configured to parse and tag to annotate text as part of NLU processing. For example, for the text "what's my bank account balance," "account balance request" may be tagged as a command (to retrieve and provide a bank account balance) and "my" may be tagged as the naming identifier of the bank account.

To correctly perform NLU processing of speech input, an NLU process 146 may be configured to determine a "domain" of the utterance so as to determine and narrow down which services offered by the endpoint device (e.g., remote system 104 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 862 receives a query in the form of ASR results and attempts to identify relevant grammars and lexical information that may be used to construe meaning. To do so, the NLU component 146 may begin by identifying potential domains that may relate to the received query. The NLU storage 873 includes a database of devices (874a-874n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 863, language model and/or grammar database (876a-876n), a particular set of intents/actions (878a-878n), and a particular personalized lexicon (886). Each gazetteer (884a-884n) may include domain-indexed lexical information associated with a particular user and/or device. For example, the Gazetteer A (884a) includes domain-index lexical information 886aa to 886an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 864 parses the query to determine an intent or intents for each identified domain, where the intent corresponds to the action to be performed that is responsive to the query. Each domain is associated with a database (878a-878n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 864 identifies potential intents for each identified domain by comparing words in the query to the words and phrases in the intents database 878. In some instances, the determination of an intent by the IC component 864 is performed using a set of rules or templates that are processed against the incoming text to identify a matching intent.

In order to generate a particular interpreted response, the NER 862 applies the grammar models and lexical information associated with the respective domain to actually recognize a mention of one or more entities in the text of the query. In this manner, the NER 862 identifies "slots" or values (i.e., particular words in query text) that may be needed for later command processing. Depending on the complexity of the NER 862, it may also label each slot with a type of varying levels of specificity (such as noun, place, device name, device location, city, artist name, song name, amount of time, timer number, or the like). Each grammar model 876 includes the names of entities (i.e., nouns) commonly found in speech about the particular domain (i.e., generic terms), whereas the lexical information 886 from the gazetteer 884 is personalized to the user(s) and/or the device. For instance, a grammar model associated with the shopping domain may include a database of words commonly used when people discuss shopping.

The intents identified by the IC component 864 are linked to domain-specific grammar frameworks (included in 876) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (876) framework or frameworks may correspond to sentence structures such as "purchase item called 'Item A' from Marketplace A."

For example, the NER component 862 may parse the query to identify words as subject, object, verb, preposition, etc., based on grammar rules and/or models, prior to recognizing named entities. The identified verb may be used by the IC component 864 to identify intent, which is then used by the NER component 862 to identify frameworks. A framework for the intent of "play a song," meanwhile, may specify a list of slots/fields applicable to play the identified "song" and any object modifier (e.g., specifying a music collection from which the song should be accessed) or the like. The NER component 862 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 862 may search the database of generic words associated with the domain (in the knowledge base 872). So, for instance, if the query was "identify this song," after failing to determine which song is currently being output, the NER component 862 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 850. The destination speechlet 850 may be determined based on the NLU output. For example, if the NLU output includes a command to send a message, the destination speechlet 850 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the speechlet 850 may provide some or all of this information to a text-to-speech (TTS) engine. The TTS engine may then generate an actual audio file for outputting the audio data determined by the application (e.g., "okay," or "here's your bank account balance"). After generating the file (or "audio data"), the TTS engine may provide this data back to the remote system 104.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 146 during runtime operations where NLU operations are performed on text (such as text output from an ASR component 144). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 863. Each recognizer may include various NLU components such as an NER component 862, IC component 864 and other components such as an entity resolver, or other components.

For example, a messaging domain recognizer 863-A (Domain A) may have an NER component 862-A that identifies what slots (i.e., portions of input text) may correspond to particular words relevant to that domain. The words may correspond to entities such as (for the messaging domain) a recipient. An NER component 862 may use a machine learning model, such as a domain specific conditional random field (CRF) to both identify the portions corresponding to an entity as well as identify what type of entity corresponds to the text portion. The messaging domain recognizer 863-A may also have its own intent classification (IC) component 864-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 104 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 104, as illustrated herein are exemplary, and may be located in a stand-alone device or may be included, in whole or in part, as a component of a larger device or system, may be distributed across a network or multiple devices connected by a network, etc.

Figure 9:
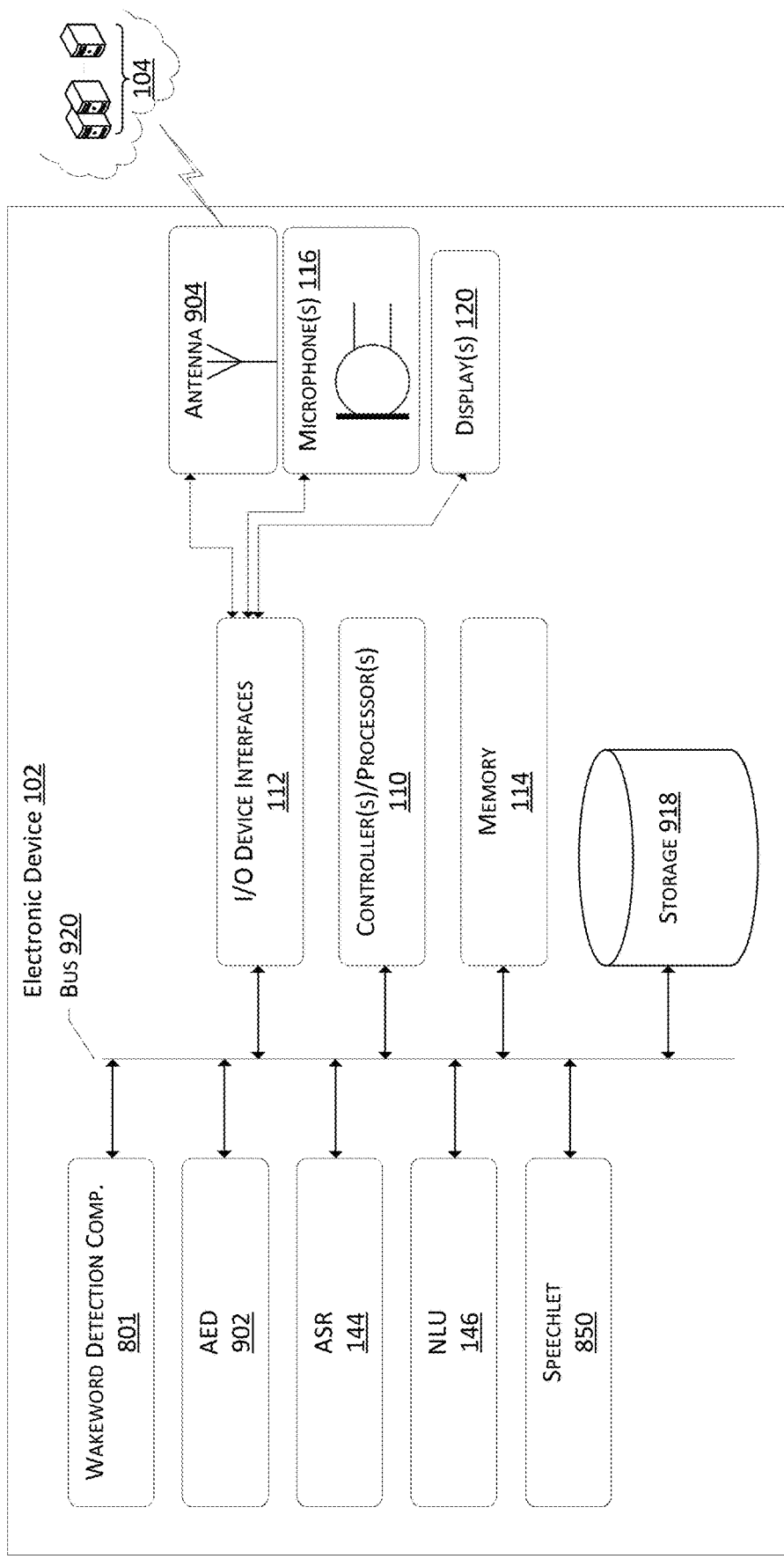
FIG. 9 illustrates a conceptual diagram of example components of an electronic device that may be utilized in association with automated actions for application policy violations.

FIG. 9 illustrates a conceptual diagram of example components of an electronic device 102 that may be utilized in association with improved packet resiliency associated with a wireless data protocol. The device 102 may be implemented as a standalone device 102 that is relatively simple in terms of functional capabilities with limited input/output components, memory, and processing capabilities. For instance, the device 102 may not have a keyboard, keypad, or other form of mechanical input. The device 102 may also lack a display (other than simple lights, for instance) and a touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the device 102. Nonetheless, the primary, and potentially only mode, of user interaction with the device 102 is through voice input and audible output. In some instances, the device 102 may simply comprise a microphone 116, a power source, and functionality for sending generated audio data via one or more antennas 904 to another device.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include a keyboard, a mouse, a display, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) and may utilize speaker(s) of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 116, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 9 may include one or more controllers/processors 110, that may include a central processing unit (CPU) for processing data and computer-readable instructions, and memory 114 for storing data and instructions of the device 102. The device 102 may also be connected to removable or external non-volatile memory and/or storage, such as a removable memory card, memory key drive, networked storage, etc., through input/output device interfaces 112.

Computer instructions for operating the device 102 and its various components may be executed by the device's controller(s)/processor(s) 110, using the memory 114 as temporary "working" storage at runtime. A device's computer instructions may be stored in a non-transitory manner in non-volatile memory 114, storage 918, or an external device(s). Alternatively, some or all of the executable instructions may be embedded in hardware or firmware on the device 102 in addition to or instead of software.

The device 102 may include input/output device interfaces 112. A variety of components may be connected through the input/output device interfaces 112. Additionally, the device 102 may include an address/data bus 920 for conveying data among components of the respective device. Each component within a device 102 may also be directly connected to other components in addition to, or instead of, being connected to other components across the bus 920.

The device 102 may include a display 120, which may comprise a touch interface. Any suitable display technology, such as liquid crystal display (LCD), organic light emitting diode (OLED), electrophoretic, and so on, may be utilized for the displays 120. Furthermore, the processor(s) 110 may comprise graphics processors for driving animation and video output on the associated display, or the device 102 may be "headless" and may primarily rely on spoken commands for input. As a way of indicating to a user that a connection between another device has been opened, the device 102 may be configured with one or more visual indicators, such as the light elements(s), which may be in the form of LED(s) or similar components (not illustrated), that may change color, flash, or otherwise provide visible light output, such as for a notification indicator on the device 102. The input/output device interfaces 112 that connect to a variety of components. This wired or a wireless audio and/or video port may allow for input/output of audio/video to/from the device 102. The device 102 may also include an audio capture component. The audio capture component may be, for example, a microphone 116 or array of microphones, a wired headset or a wireless headset, etc. The microphone 116 may be configured to capture audio. If an array of microphones is included, approximate distance to a sound's point of origin may be determined using acoustic localization based on time and amplitude differences between sounds captured by different microphones of the array. The device 102 (using microphone 116, wakeword detection component 801, ASR component 144, etc.) may be configured to generate audio data corresponding to captured audio. The device 102 (using input/output device interfaces 112, antenna 904, etc.) may also be configured to transmit the audio data to the remote system 104 for further processing or to process the data using internal components such as a wakeword detection component 801.

Via the antenna(s) 904, the input/output device interface 112 may connect to one or more networks 108 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s) 108, the speech-processing system may be distributed across a networked environment. Accordingly, the device 102 and/or the remote system 104 may include an ASR component 144. The ASR component 144 of device 102 may be of limited or extended capabilities. The ASR component 144 may include language models stored in ASR model storage component, and an ASR component 144 that performs automatic speech recognition. If limited speech recognition is included, the ASR component 144 may be configured to identify a limited number of words, such as keywords detected by the device, whereas extended speech recognition may be configured to recognize a much larger range of words.

The device 102 and/or the remote system 104 may include a limited or extended NLU component 146. The NLU component 146 of device 102 may be of limited or extended capabilities. The NLU component 146 may comprise a name entity recognition module, an intent classification module and/or other components. The NLU component 146 may also include a stored knowledge base and/or entity library, or those storages may be separately located.

In examples, AED 902 may also be performed by the device 102. In these examples, the operations may include causing the AED component 902 to be enabled or otherwise turned on, or the operations may include causing the AED component 902 to transition from a first mode to a second mode representing a higher sensitivity to audio data generated by the microphone 116. The AED component 902 may utilize the audio data generated by the microphone 116 to determine if an audio fingerprint of the audio data, or portion thereof, corresponds to a reference audio fingerprint associated with the predefined event. For example, the one or more predefined events may be associated with one or more reference audio fingerprint characteristics of sound made when the event occurs. For example, the sound of a given person speaking may have a given audio fingerprint, the sound of a different person speaking may have another audio fingerprint, etc. The AED component 902 may receive an indication that audio has been captured and may utilize reference audio fingerprints for analysis in association with the audio fingerprint in question. It should be understood that while the term "audio fingerprint" is utilized herein, that term may include other terms such as "audio fingerprint" and/or "audio characteristics" and may correspond to characteristics of the audio data. For example, audio fingerprints may be generated utilizing a spectrogram that may split the audio data up over time and graphs frequency to amplitude over time. Peaks in frequency and/or amplitude may be identified in the spectrogram and may be utilized as characteristic points for comparison to reference audio fingerprints. The AED component 902 may determine that the audio fingerprint corresponds to at least one of the reference audio fingerprints, such as to a given confidence level, and may generate confirmatory data indicating that the audio fingerprint corresponds to the at least one reference audio fingerprint.

The device 102 and/or the remote system 104 may also include speechlet 850 that is configured to execute commands/functions associated with a spoken command as described herein. The device 102 may include a wake word engine, which may be a separate component or may be included in an ASR component 144. The wakeword detection component 801 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred. In examples, the device 102 and may not include speaker(s) 118 and may utilize speaker(s) of an external or peripheral device to output audio via the speaker(s) of the external/peripheral device.

Figure 10:
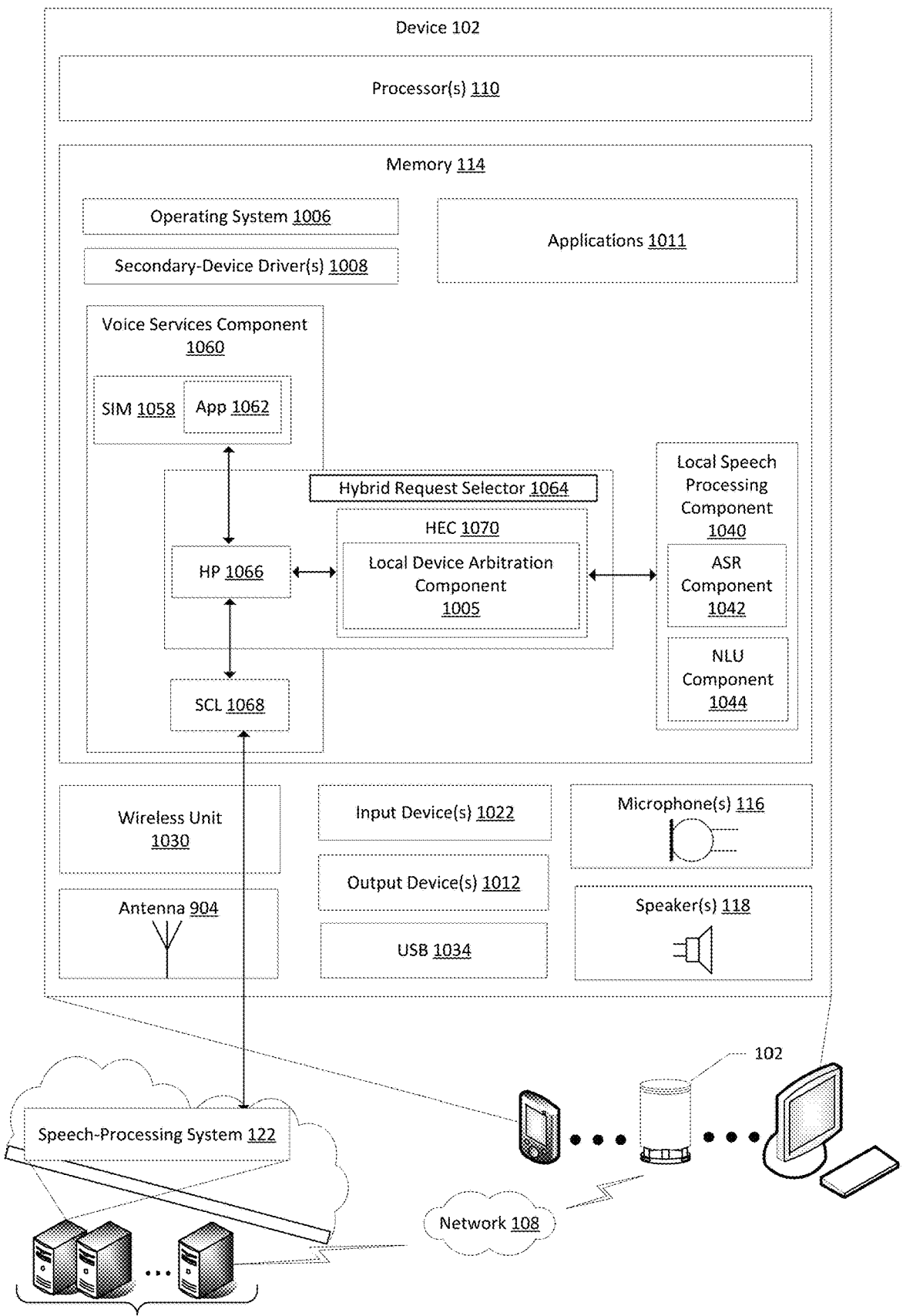
FIG. 10 illustrates a schematic diagram illustrating components of an electronic device that may perform an action with respect to user speech.

FIG. 10 is a block diagram illustrating a system 1000 including example components of an electronic device, such as the device 102 described herein. The device 102 may be implemented as a standalone device that is relatively simple in terms of functional capabilities with limited input/output components, memory, and processing capabilities. For instance, the device 102 does not have a keyboard, keypad, or other form of mechanical input. Nor does it have a display (other than simple lights, for instance) or touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the device 102 is through voice input and audible output.

The device 102 may also be implemented in other form factors, such as a mobile device (e.g., a smart phone or personal digital assistant). The mobile device may include a touch-sensitive display screen and various buttons for providing input as well as additional functionality such as the ability to send and receive telephone calls. Alternative implementations of the device 102 may also include configuration as a personal computer. The personal computer may include a keyboard, a mouse, a display screen, and any other hardware or functionality that is typically found on a desktop, notebook, netbook, or other personal computing devices. These devices, however, are merely examples and not intended to be limiting, as the techniques described in this disclosure may be used in essentially any device that has an ability to recognize speech input or other types of natural language input.

In the illustrated implementation, the device 102 includes one or more processors 110 and memory 114. In some implementations, the processors(s) 110 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110 may possess its own local memory, which also may store program modules, program data, and/or one or more operating systems.

The memory 114 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 704 may be implemented as computer-readable storage media ("CRSM"), which may be any available physical media accessible by the processor(s) 110 to execute instructions stored on the memory 114. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 110.

Several modules such as instruction, datastores, and so forth may be stored within the memory 114 and configured to execute on the processor(s) 110. A few example functional modules are shown as applications stored in the memory 114 and executed on the processor(s) 110 to implement the functionality described herein, although the same functionality may alternatively be implemented in hardware, firmware, or as a system on a chip (SOC).

An operating system module 1006 may be configured to manage hardware within and coupled to the device 102 for the benefit of other modules. In addition, in some instances the device 102 may include some or all of one or more secondary-device drivers 1008. In other instances, meanwhile, the device 102 may be free from the drivers 1008 for interacting with second devices. The device 102 may further include a local device arbitration component 1005 that is configured to perform local device arbitration procedures, as described herein, including determining when to perform speech processing on the device 102 and when to request speech processing to be performed by the remote system 104. The device 102 may further include a local speech processing component 1040.

The local speech processing component 1040 is configured to receive the audio data as input, to recognize speech in the audio data, to determine user intent from the recognized speech, and to determine how to act on the user intent by generating a directive (or directive data). In some cases, a directive may include a description of the intent (e.g., an intent to play jazz music). In some cases, a directive may include (e.g., encode) an identifier of a second device, and an operation to be performed at the second device.

In some embodiments, the device 102 may be configured to compare the audio data to stored models used to detect a wakeword that indicates to the device 102 that the audio data is to be processed for determining an intent. For example, the device 102 may convert audio into audio data, and process the audio data to determine whether speech is detected, and if so, if the audio data comprising speech matches an audio signature and/or model corresponding to a particular keyword. The device 102 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 102 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input. Once speech is detected in the audio received by the device 102 (or separately from speech detection), the device 102 may perform wakeword detection to determine when a user intends to speak a command to the device 102. This process may also be referred to as keyword detection, with the wakeword being a specific example of a keyword. Specifically, keyword detection may be performed without performing linguistic analysis, textual analysis or semantic analysis. Instead, incoming audio (or audio data) can be analyzed to determine if specific characteristics of the audio match preconfigured acoustic waveforms, audio signatures, or other data to determine if the incoming audio "matches" stored audio data corresponding to a keyword. Thus, wakeword detection may involve comparing audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding can be used to search the best path in the decoding graph, and the decoding output can be further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing can be applied for decision making. Other techniques for wakeword detection, such as those known in the art, may also be used.

In some embodiments, the device 102 can have hybrid capabilities to send audio data to a remote system 104 for speech processing using a remote speech processing system 122 while the local speech processing component 1040 processes the audio data in parallel or alternatively. Thus, the local device arbitration techniques described herein may be implemented whenever the device 102 chooses to perform an action with respect to user speech with locally-generated directive data from the local speech processing component 1040.

Among other logical and physical components, the local speech processing component 1040 may include an automatic speech recognition (ASR) component 1042 that is configured to perform ASR on the audio data to convert the audio data into ASR text data. ASR transcribes audio data into text data representing the words of the user speech contained in the audio data. A spoken utterance in the audio data can be input to the ASR component 1042, which then interprets the utterance based on the similarity between the utterance and pre-established language models available to the local speech processing component 1040. For example, the ASR component 1042 may compare the input audio data with models for sounds (e.g., subword units or phonemes) and sequences of sounds to identify words that match the sequence of sounds spoken in the utterance of the audio data. In some embodiments, the ASR component 1042 outputs the most likely text recognized in the audio data, or multiple hypotheses in the form of a lattice or an N-best list with individual hypotheses corresponding to confidence scores or other scores (such as probability scores, etc.). In some embodiments, the ASR component 1042 is customized to the user (or multiple users) who created a user account to which the device 102 is registered. For instance, the language models (and other data) used by the ASR component 1042 may be based on known information (e.g., preferences) of the user, and/or on a history of previous interactions with the user.

The local speech processing component 1040 may also include a natural language understanding (NLU) component 1044 that performs NLU on the generated ASR text data to determine an intent so that directives may be determined based on the intent. Generally, the NLU component 1044 takes textual input (e.g., from the ASR component 1042) and attempts to make a semantic interpretation of the ASR text data. That is, the NLU component 1044 determines the meaning behind the ASR text data based on the individual words, and then the NLU component 1044 can implement that meaning. The NLU component 1044 interprets a text string to derive an intent or a desired action or operation from the user. This may include deriving pertinent pieces of information in the text that allow the NLU component 1044 to identifying a second device in the environment, if the user, for example, intends to control a second device (e.g., a light in the user's house). For example, the ASR component 1042 may outputs the ASR text "Play some jazz," and the NLU component 1044 may determine that the user intended to play jazz music. The local speech processing component 1040 may also provide a dialog management function to engage in speech dialogue with the user to determine (e.g., clarify) user intents by asking the user for information using speech prompts. In some embodiments, the NLU component 1044 is customized to the user (or multiple users) who created a user account to which the device 102 is registered. For instance, data used by the NLU component 1044 to understand the meaning of ASR text may be based on known information (e.g., preferences) of the user, and/or on a history of previous interactions with the user.

The local speech processing component 1040 may also include, or be configured to use, one or more installed speechlets. Speechlets may represent domains that are used in order to determine how to act on an utterance in a particular way, such as by outputting a directive that corresponds to the determined intent, and which can be processed to implement the desired operation. The speechlets installed on the device 102 may include, without limitation, a music speechlet (or music domain) to act an utterances with intents to play music on a device, such as via a speaker(s) of the device 102, a shopping speechlet (or shopping domain) to act on utterances with intents to buy an item from an electronic marketplace, and/or a device control speechlet (or device control domain) to act on utterances with intents to control a second device(s) in the environment.

It is to be appreciated that the local speech processing component 1040 may be configured to generate, as output, directive data that can be processed by downstream components of the device 102 to cause performance of an action. In an example, directive data that is generated by a domain/ speechlet of the local speech processing component 1040 may be formatted using Java, such as JavaScript syntax, or JavaScript-based syntax. This may include formatting the directive using JavaScript Object Notation (JSON).

Under some conditions, the device 102 may operate in conjunction with and/or under the control of the remote system 104, which can represent a remote, network-based or network-accessible control system. The remote system 104 may, in some instances be part of a network-accessible computing platform that is maintained and accessible via a wide area network 108. Network-accessible computing platforms such as this may be referred to using terms such as "on-demand computing", "software as a service (SaaS)", "platform computing", "network-accessible platform", "cloud services", "data centers", and so forth. The remote system 104 may be configured to provide particular functionality to large numbers of local (e.g., in-home, in-car, etc.) devices of different users.

In some embodiments, the remote system 104 may be configured to receive audio data from the device 102, to recognize speech in the received audio data using the remote speech processing system 122, and to perform functions in response to the recognized speech. In some embodiments, these functions involve sending directives, from the remote system 122, to the device 102 to cause the device 102 to perform an action, such as output an audible response to the user speech via a speaker(s) (i.e., an output device(s) 1012), and/or control second devices in the environment by sending a control command via the wireless unit 1030 and/or the antenna 904. Furthermore, the remote system 104 may perform device arbitration to designate a speech interface device in an environment to perform an action with respect to user speech. Thus, under normal conditions, when the device 102 is able to communicate with the remote system 104 over a wide area network 108 (e.g., the Internet), some or all of the functions capable of being performed by the remote system 104 may be performed by designating a device to field the utterance, and sending a directive(s) over the wide area network 108 to the designated device (e.g., the device 102), which, in turn, may process the directive(s), or send the directive(s) to the designated device (if the device 102 is not designated by the remote system 104), for performing an action(s). For example, the remote system 104 may instruct the device 102 to output an audible response (e.g., using text-to-speech (TTS)) to a user's question, to output content (e.g., music) via a speaker 118 of the device 102, and/or to turn on a light in the environment. It is to be appreciated that the remote system 104 may be configured to provide other functions in addition to those discussed herein, such as, without limitation, conducting an electronic commerce transaction on behalf of the user as part of a shopping function, establishing a communication session between the user and another user, and so on.

In some embodiments, connectivity may not be a binary condition in the sense that the devices in the environment either have connectivity to the remote system 104 or not. For example, some devices in the environment may lose connectivity to the remote system 104 while others remain connected. In this scenario, the device 102 may designated a first speech interface device to field an utterance, while the remote system 104 selects a second speech interface device to field the utterance. If the first speech interface device loses connectivity (e.g., goes offline), then the HEC 1070 may attempt to send directive data to the first speech interface device, while the second speech interface device may receive directive data from the remote system 104 and may perform an action based on the remotely-generated directive data. In this scenario, the local device arbitration component 1005 may notice the response from the remote system 104 that designates the second speech interface device to field the utterance, and use the availability of the remote response to invalidate its own arbitration decision that designated the first speech interface device to field the utterance. If, on the other hand, the second speech interface device loses connectivity (e.g., goes offline), then the HEC 1070 may receive an "empty" response from the remote system 104, and, in response, may send locally-generated directive data to the first speech interface device, or redirect the locally-generated directive data (produced from audio data generated by the first speech interface device) to the second speech interface device.

The device 102 may also include a plurality of applications 1011 stored in the memory 114 or otherwise accessible to the device 102. The device 102 may include any number or type of applications and is not limited to the specific examples shown here. When a remote system is unavailable to the device 102, these applications 1011 may be configured to access local resources (e.g., local music or movie libraries, a local shopping list, a local calendar, etc.). In some cases, changes made to these local resources may be synched with remote versions of those resources when the remote system subsequently becomes available to the device 102.

Audio data representing a user's speech may be ultimately received by a speech interaction manager (SIM) 1058 of a voice services component 1060 executing on the device 102. The SIM 1058 may manage received audio data by processing utterances as events, and the SIM 1058 may also manage the processing of directives that are used to respond to the user speech (e.g., by controlling the action(s) of the device 102). The SIM 1058 may include one or more client applications 1011 or skills for performing various functions at the device 102.

A hybrid request selector 1064 (or, hybrid request selector component 1064) of the device 102 is shown as including a hybrid proxy (HP) 1066 (or, hybrid proxy (HP) subcomponent 1066), among other components. The HP 1066 can be implemented as a layer within the voice services component 1060 that is located between the SIM 1058 and a speech communication library (SCL) 1068, and may be configured to proxy traffic to/from the remote system 104. For example, the HP 1066 may be configured to pass messages between the SIM 1058 and the SCL 1068 (such as by passing events and directives there between), and to send messages to/from a hybrid execution controller (HEC) 1070 (or, hybrid execution controller (HEC) subcomponent 1070). By "hooking into" the HP 1066, the HEC 1070 is given the ability to "snoop" on communication between the SIM 1058 and the remote system 104 via the SCL 1068. For instance, directive data received from the remote system 104 can be sent to the HEC 1070 using the HP 1066, which sits in the path between the SCL 1068 and the SIM 1058. The HP 1066 may also be configured to allow audio data received from the SIM 1058 to pass through to the remote speech processing system 122 (via the SCL 1068) while receiving this audio data and sending the received audio data to the HEC 1070.

The HEC 1070 may act as a local endpoint, allowing other components to reach a local speech processing component 1040 that is configured to process audio data representing user speech. In some embodiments, the HEC 1070 is configured to handle different transports and protocols when messages and data are received from other devices in the environment by converging the received messages to a common protocol (e.g., using a protocol translator). The HEC 1070 may further control the execution of the local speech processing component 1040, such as by sending "execute" and "terminate" events/instructions to the local speech processing component 1040. An "execute" event may instruct the local speech processing component 1040 to continue its execution based on audio data (e.g., by instructing the local speech processing component 1040 to execute on a previously-determined intent in order to generate a directive). Meanwhile, a "terminate" event may instruct the local speech processing component 1040 to terminate further execution based on the audio data, such as when the device 102 receives directive data from the remote system 104 and chooses to use that remotely-generated directive data.

As shown in FIG. 10, the local device arbitration component 1005 may be implemented as a subcomponent of the HEC 1070. As such, the HEC 1070 can implement device arbitration logic, as described herein, to determine a most appropriate speech interface device to perform an action with respect to the user speech. In an illustrative example, where the user utters the wakeword followed by the expression "What time is it?", audio data corresponding to the utterance is received by the SIM 1058 of the voice services component 1060. Assuming the device 102 is one of multiple devices that detected the utterance, the audio data may correspond to audio data that was generated by the device 102, and the SIM 1058 may send the audio data through the HP 1066 of the hybrid request selector 1064, which allows the audio data to pass through to the SCL 1068, and the SCL 1068, in turn, sends the audio data over the wide area network 108 to the remote system 104 for processing speech remotely. The wide area network 108 is representative of any type of public or private, wide-area network, such as the Internet, which extends beyond the environment of the device 102. Thus, the wide area network 108 may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

The HP 1066 may also receive the audio data and send the received audio data to the HEC 1070. Assuming the device 102 detected the utterance, the audio data may correspond to audio data that was generated by the device 102. Assuming another speech interface device(s) in the environment also detected the utterance, the HP 1066 may receive additional speech recognition events from those other devices. In the case of non-hybrid speech interface devices, these speech recognition events may be received with the audio data generated by the non-hybrid speech interface device(s). In the case of an additional device with hybrid capabilities, the speech recognition event may be received as a notification.

With multiple speech recognition events in-hand, the local device arbitration component 1005 of the HEC 1070 may implement the time-based local device arbitration techniques described herein to designate a speech interface device (e.g., the device 102, or another speech interface device in the environment) as a designated device to perform an action with respect to the user speech. Depending on which device is designated to perform the action with respect to the user speech, the audio data generated by that designated device may be input to the local speech processing component 1040 for determining an intent and generating directive data. Alternatively, in the case where another device is designated to field the utterance, the device 102 may refrain from processing speech locally, and may allow the other device to do so using its own local speech processing component.

The hybrid request selector 1064 may be configured to wait for a response from either or both of the remote system 104 or the local speech processing component 1040. Depending on the availability of the remote system 104, a response from the remote system 104 may or may not be received, and the timing of the receipt of such a response may vary (e.g., a response from the remote system 104 may be received before or after a response from the local speech processing component 1040). In any scenario, the HEC 1070 of the hybrid request selector 1064 is configured to determine whether to respond to the user speech with directive data generated by the local speech processing component 1040, or, if a response from the remote system 104 is received, whether to respond to the user speech with second directive data received from the remote system 104. When a response (second data) from the remote system 104 is received by the SCL 1068 for example, the HP 1066 may send this second data, including remotely-generated directive data, to the HEC 1070. The HEC 1070 can then implement selection logic to choose which response to utilize in responding to the user speech. If the HEC 1070 determines to respond to the user speech with directive data generated by the local speech processing component 1040, the local speech processing component 1040 can generate directive data and send it to the HEC 1070, whereby the locally-generated directive data can be sent to the SIM 1058 via the HP 1066 for causing performance of the action by the designated device.

In some embodiments, the device 102 may discover other devices in the environment, and may implement secure, authenticated communication with the discovered devices, such as by bootstrapping a secure sockets layer (SSL) connection. In an example, the HEC 770 may generate a self-signed certificate(s), and may request the operating system 706 (e.g., a Java Wrapper of the operating system 1006) to advertise a service. This service advertisement may utilize any suitable protocol and/or framework, such as the Discovery-and-Launch (DIAL) protocol and/or Whisperplay framework for device discovery. Another speech interface device that is connected to a common network (e.g., subnet, local area network, etc.) as the device 102 may (via its own hybrid proxy component) generate a self-signed certificate(s) and may attempt to discover any advertised services. Upon discovering the service advertised by the device 102, the other speech interface device may perform an authentication procedure with the device 102, whereby the self-signed certificates (and metadata) are exchanged, and a SSL is established between the device 102 and the other speech interface device upon certificate verification. In some embodiments, the device 102 may implement the DIAL protocol to discover and establish a secure, authenticated communication channel with a second speech interface device in the same environment. In some embodiments, this discovery and communication may be accomplished by registering applications executing on the devices (e.g., applications executing on the device 102) with a DIAL registry, and these applications may be configured to handle DIAL launch intent payloads (information that can be passed between applications via a DIAL launch request). In some embodiments, a manifest of the operating system 706 may be modified to support Whisperplay and DIAL, and a Whisperplay.xml file may be added to resources of application(s) in the res/xml/directory for purposes of local device discovery.

Generally, the device 102 has input devices 1022 and output devices 1012. The input devices 1022 may include, without limitation, a keyboard, keypad, mouse, touch screen, joystick, control buttons, etc. In some implementations, one or more microphones 116 may function as input devices 1022 to receive audio input, such as user voice input. The output device(s) 1012 may include, without limitation, a display(s), a light element (e.g., LED), a vibrator to create haptic sensations, or the like. In some implementations, one or more speakers 118 may function as output devices 1012 to output audio sounds (e.g., audio content, TTS responses, tones at various frequencies, etc.).

A user may interact with the device 102 by speaking to it, and the one or more microphone(s) 116 captures the user's speech. The device 102 can communicate back to the user by emitting audible statements through the speaker 118. In this manner, the user can interact with the device 102 solely through speech, without use of a keyboard or display.

The device 102 may further include a wireless unit 1030 coupled to an antenna 904 to facilitate a wireless connection to a network. The wireless unit 1030 may implement one or more of various wireless and/or IoT technologies, such as Bluetooth® protocol, Bluetooth Low Energy (BLE) protocol, ZigBee® protocol, Z-wave® protocol, WiFi protocol, and/or any other type of protocol usable to communicate wirelessly between electronic devices in an environment, including those that do and/or do not rely data transmission over a wide area network. As such, the device 102 may be configured to act as a device that can communicate with second devices in the environment and control the second devices, such as by using protocol stacks, drivers, and adapters to communicate over a suitable communications protocol. A USB port 1034 may further be provided as part of the device 102 to facilitate a wired connection to a network, or a plug-in network device that communicates with other wireless networks. In addition to the USB port 1034, or as an alternative thereto, other forms of wired connections may be employed, such as a broadband connection, Transmission Control Protocol/Internet Protocol (TCP/IP) protocol connection, etc.

Accordingly, when implemented as the primarily-voice-operated speech interface device, there may be no input devices, such as navigation buttons, keypads, joysticks, keyboards, touch screens, and the like other than the microphone(s) 116. Further, there may be no output such as a display for text or graphical output. The speaker(s) 118 may be the main output device. In one implementation, the device 102 may include non-input control mechanisms, such as basic volume control button(s) for increasing/decreasing volume, as well as power and reset buttons. There may also be a simple light element (e.g., LED) to indicate a state such as, for example, when power is on.

Accordingly, the device 102 may be implemented as an aesthetically appealing device with smooth and rounded surfaces, with one or more apertures for passage of sound waves. The device 102 may merely have a power cord and optionally a wired interface (e.g., broadband, USB, etc.). As a result, the device 102 may be generally produced at a low cost. Once plugged in, the device 102 may automatically self-configure, or with slight aid of the user, and be ready to use. In other implementations, other I/O components may be added to this basic model, such as specialty buttons, a keypad, display, and the like.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
   one or more processors; and
   non-transitory computer-readable media storing computer-executable instructions that, when executed by the one or more processors, cause the one or more processors to perform operations comprising:
      receiving input data associating a policy violation and contextual information with a first action to be performed when the policy violation occurs in association with a response to a user request, the response received from an application selected to determine the response, the application configured for use with a voice interface device;
      generating first data representing a rule for taking the first action, the rule indicting that the first action is to be taken when the policy violation is determined to occur and the contextual information is associated with the policy violation;
      storing the first data representing the rule as one of multiple rules associated with policy violations including the policy violation;
      receiving audio data representing a user utterance from the voice interface device;
      determining, from the audio data, that the user utterance is associated with a request for the response from the application;
      receiving second data indicating the response is associated with the policy violation and the contextual information; and
      prior to the response being output by the voice interface device:
         selecting, utilizing the first data and in response to the second data indicating occurrence of the policy violation in association with the contextual information, the rule;
         determining the first action to be taken to rectify the policy violation utilizing the rule;
         generating third data representing a command to perform the first action specified by the rule; and
         causing the first action to be performed utilizing the command.

2. The system of claim 1, the operations further comprising:
   determining fourth data representing a first policy-violation score for an entity identifier indicated to have developed the application, the first policy-violation score indicating historical policy violations associated with the entity identifier;
   determining that the first policy-violation score satisfies a first threshold policy-violation score, the first threshold policy-violation score included as a first portion of the contextual information;
   determining fifth data representing a second policy-violation score associated with the application, the second policy-violation score indicating historical policy violations associated with the application;
   determining that the second policy-violation score satisfies a second threshold policy-violation score, the second threshold policy-violation score included a second portion of the contextual information; and
   wherein selecting the rule is in response to the first policy-violation score satisfying the first threshold policy-violation score and the second policy-violation score satisfying the second threshold policy-violation score.

3. The system of claim 1, the operations further comprising:
   causing a second action to be performed in association with a first instance of a second policy violation, the second action determined from the multiple rules;
   storing fourth data associating the second action with the second policy violation;
   receiving fifth data indicating a second instance of the second policy violation has occurred; and
   determining to refrain from selecting one or more of the multiple rules in response to the fourth data associating the second action with the second policy violation; and
   causing the second action to be performed in association with the second instance of the second policy violation.

4. The system of claim 1, the operations further comprising:
   receiving feedback data associated with causing the first action to be taken in association with the second data, the feedback data indicating the first action should not have been associated with the policy violation;
   determining one or more alternative actions to associate with subsequent instances of the policy violation;
   generating a user interface configured to display an indication of the one or more alternative actions;
   receiving user input data indicating a selected alternative action from the one or more alternative actions; and
   generating fourth data associating the policy violation and the contextual information with the selected alternative action.

5. A method, comprising:
   associating a policy violation and contextual information with a first action to be performed when the policy violation occurs in association with a response from an application, the application configured for use with a voice interface device;
   generating first data representing a rule for taking the first action, the rule indicting that the first action is to be taken when the policy violation is determined to occur and the contextual information is associated with the policy violation;
   storing first data representing the rule;
   receiving audio data representing a user utterance from the voice interface device;
   determining, from the audio data, that the user utterance is associated with a request for the response from the application;
   receiving second data indicating the response is associated with the policy violation and the contextual information;
   selecting, based at least in part on the second data, the rule;
   determining the first action to be taken based at least in part on the rule; and
   causing the first action to be performed.

6. The method of claim 5, further comprising:
determining third data representing a first score for an entity identifier associated with the application, the first score indicating historical policy violations associated with the entity identifier;
determining fourth data representing a second score associated with the application, the second score indicating historical policy violations associated with the application; and
wherein selecting the rule comprises selecting the rule based at least in part on the third data and the fourth data.

7. The method of claim 5, further comprising:
storing third data indicating that a second action has been previously performed in association with a first instance of a second policy violation;
receiving fourth data indicating a second instance of the second policy violation has occurred; and
causing, based at least in part on the second action having been performed in association with the first instance of the second policy violation, the second action to be performed.

8. The method of claim 5, further comprising:
receiving third data indicating subsequent occurrence of the policy violation by the application within a threshold period of time from receiving the second data; and
determining to refrain from causing the first action to be performed in response to the subsequent occurrence based at least in part on the third data being received within the threshold period of time.

9. The method of claim 5, further comprising:
determining that the policy violation is associated with a violation severity value;
determining that the violation severity value satisfies a threshold violation severity value; and
determining to refrain from causing the first action to be performed for a predetermined period of time based at least in part on the violation severity value satisfying the threshold violation severity value.

10. The method of claim 5, further comprising:
generating a user interface configured to:
display options for associating rules with:
policy violations including the policy violation; and
the contextual information; and
receive user input representing selection of the options;
receiving, utilizing the user interface, user input data representing selection of the rule to be performed when the policy violation occurs; and
wherein associating the policy violation and the contextual information with the first action is based at least in part on the user input data.

11. The method of claim 5, further comprising:
determining that the second data was received from a policy violation evaluation component configured to monitor first policy violation types, the policy violation evaluation component being one of multiple policy violation evaluation components; and
wherein the contextual information includes an identifier of the policy violation evaluation component.

12. The method of claim 5, further comprising:
determining a number of times the policy violation has occurred in association with the application;
determining that the number of times satisfies a threshold number of times; and
causing the application to be suppressed from use based at least in part on the number of times satisfying the threshold number of times.

13. A system, comprising:
one or more processors; and
non-transitory computer-readable media storing computer-executable instructions that, when executed by the one or more processors, cause the one or more processors to perform operations comprising:
associating a policy violation and contextual information with a first action to be performed when the policy violation occurs in association with a response from an application, the application configured for use with a voice interface device;
generating first data representing a rule for taking the first action, the rule indicting that the first action is to be taken when the policy violation is determined to occur and the contextual information is associated with the policy violation;
storing first data representing the rule;
receiving audio data representing a user utterance from the voice interface device;
determining, from the audio data, that the user utterance is associated with a request for the response from the application;
receiving second data indicating the response is associated with the policy violation and the contextual information;
selecting, based at least in part on the second data, the rule;
determining the first action to be taken based at least in part on the rule; and
causing the first action to be performed.

14. The system of claim 13, the operations further comprising:
determining third data representing a first score for an entity identifier associated with the application, the first score indicating historical policy violations associated with the entity identifier;
determining fourth data representing a second score associated with the application, the second score indicating historical policy violations associated with the application; and
wherein selecting the rule comprises selecting the rule based at least in part on the third data and the fourth data.

15. The system of claim 13, the operations further comprising:
storing third data indicating that a second action has been previously performed in association with a first instance of a second policy violation;
receiving fourth data indicating a second instance of the second policy violation has occurred; and
causing, based at least in part on the second action having been performed in association with the first instance of the second policy violation, the second action to be performed.

16. The system of claim 13, the operations further comprising:
receiving third data indicating subsequent occurrence of the policy violation by the application within a threshold period of time from receiving the second data; and
determining to refrain from causing the first action to be performed in response to the subsequent occurrence based at least in part on the third data being received within the threshold period of time.

17. The system of claim 13, the operations further comprising:
determining that the policy violation is associated with a violation severity value;

determining that the violation severity value satisfies a threshold violation severity value; and determining to refrain from causing the first action to be performed for a predetermined period of time based at least in part on the violation severity value satisfying the threshold violation severity value.

18. The system of claim 13, the operations further comprising:

generating a user interface configured to:
- display options for associating rules with:
    - policy violations including the policy violation; and
    - the contextual information; and
- receive user input representing selection of the options;

receiving, utilizing the user interface, user input data representing selection of the rule to be performed when the policy violation occurs; and wherein associating the policy violation and the contextual information with the first action is based at least in part on the user input data.

19. The system of claim 13, the operations further comprising:

determining that the second data was received from a policy violation evaluation component configured to monitor first policy violation types, the policy violation evaluation component being one of multiple policy violation evaluation components; and wherein the contextual information includes an identifier of the policy violation evaluation component.

20. The system of claim 13, the operations further comprising:

determining a number of times the policy violation has occurred in association with the application;

determining that the number of times satisfies a threshold number of times; and causing the application to be suppressed from use based at least in part on the number of times satisfying the threshold number of times.

* * * * *